(12) United States Patent
Kitaoka

(10) Patent No.: US 7,019,538 B2
(45) Date of Patent: Mar. 28, 2006

(54) ELECTROSTATIC CAPACITANCE SENSOR TYPE MEASUREMENT APPARATUS

(75) Inventor: Atsushi Kitaoka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/763,329

(22) Filed: Jan. 26, 2004

(65) Prior Publication Data

US 2004/0217765 A1    Nov. 4, 2004

(30) Foreign Application Priority Data

Jan. 28, 2003  (JP) ............... 2003-019002
Mar. 13, 2003  (JP) ............... 2003-067778

(51) Int. Cl.
*G01R 27/26* (2006.01)

(52) U.S. Cl. ............ 324/662; 324/658; 324/686; 324/699

(58) Field of Classification Search ........ 324/658, 324/635, 644, 662, 699, 686
See application file for complete search history.

(56) References Cited

U.S. PATENT DOCUMENTS

| | | | | |
|---|---|---|---|---|
| 4,769,594 A | * | 9/1988 | Darius et al. | 324/662 |
| 5,319,977 A | * | 6/1994 | Quate et al. | 73/606 |
| 5,920,198 A | * | 7/1999 | Suzuki et al. | 324/662 |
| 6,067,025 A | * | 5/2000 | Chiu et al. | 340/686.5 |
| 6,118,283 A | * | 9/2000 | Cripe | 324/660 |
| 6,329,812 B1 | * | 12/2001 | Sundin | 324/207.16 |
| 6,538,457 B1 | * | 3/2003 | Nakayama et al. | 324/662 |
| 6,714,023 B1 | * | 3/2004 | Mallory | 324/662 |
| 6,801,044 B1 | * | 10/2004 | Kesil et al. | 324/663 |
| 6,825,673 B1 | * | 11/2004 | Yamaoka | 324/537 |

FOREIGN PATENT DOCUMENTS

JP    11-230704    8/1999

\* cited by examiner

*Primary Examiner*—Vincent Q. Nguyen
*Assistant Examiner*—Marina Kramskaya
(74) *Attorney, Agent, or Firm*—Fitzpatrick, Cella, Harper & Scinto.

(57) ABSTRACT

A measurement apparatus which measures a distance between a sensor probe and a target to be measured by using an electrostatic capacitance sensor, comprises first and second sensor probes (101, 102) which are arranged at respective predetermined gaps to the target (4), and first and second sensor amplifiers (111, 112) which are connected respectively to the first and second sensor probes, wherein when the distance between the target and the first or second sensor probe is measured, said first amplifier supplies a first current with the first sensor probe and said second amplifier supplies a second current which is different phase and/or amplitude from the first current.

7 Claims, 24 Drawing Sheets

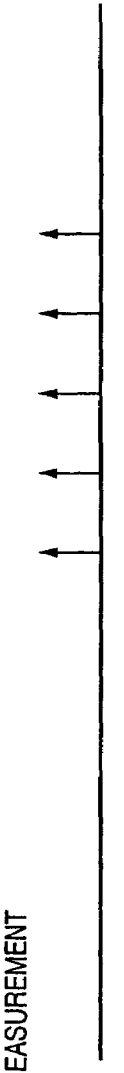
FIG. 3A DRIVE CURRENT OF SENSOR PROBE 101
FIG. 3B DRIVE CURRENT OF SENSOR PROBE 102
FIG. 3C DRIVE TIMING SIGNAL OF SENSOR 101
FIG. 3D DRIVE TIMING SIGNAL OF SENSOR 102
FIG. 3E MEASUREMENT TIMING SIGNAL OF SENSOR 101
FIG. 3F MEASUREMENT TIMING SIGNAL OF SENSOR 102

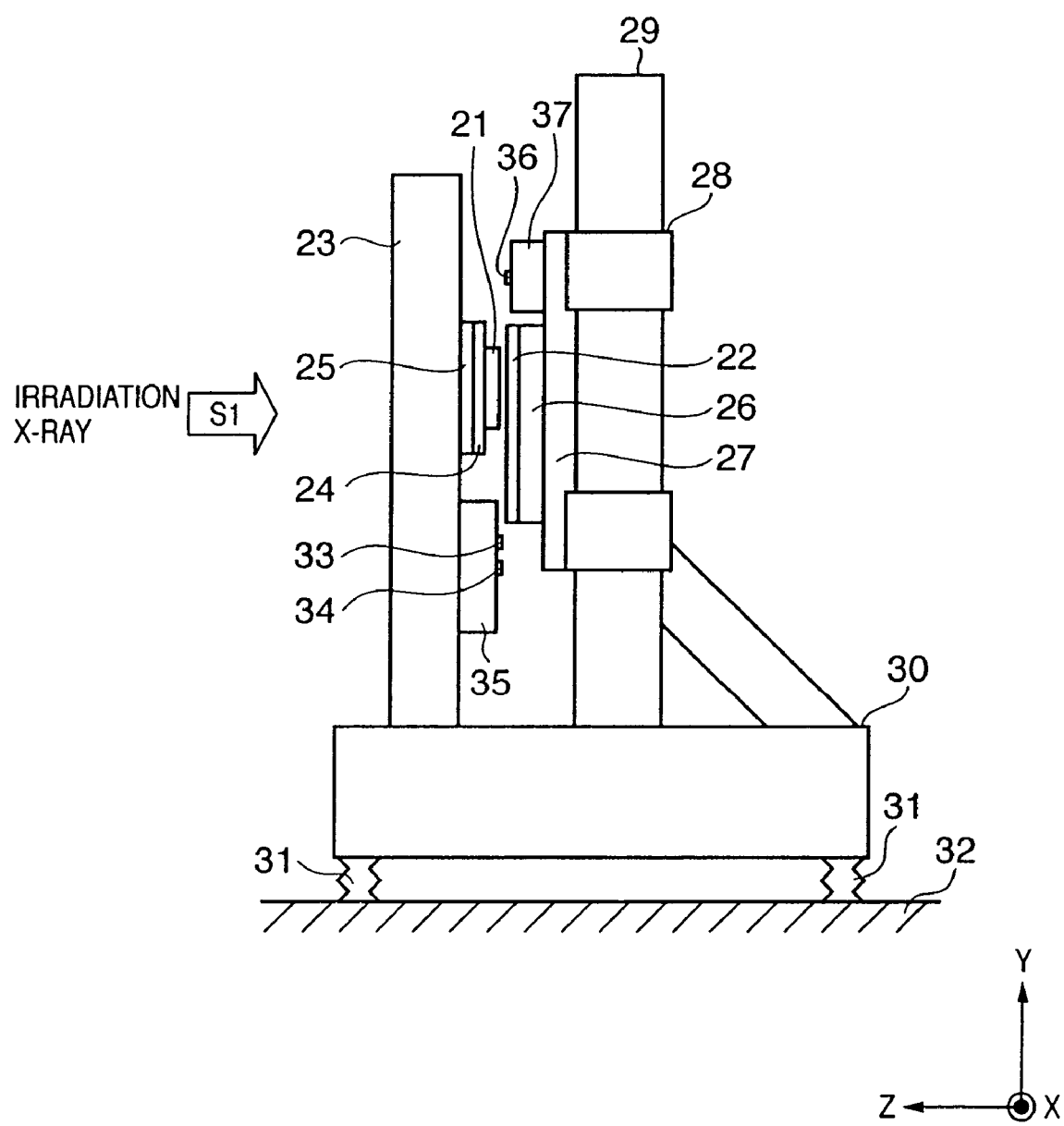

FIG. 7A

APPARATUS SEQUENCE — WAFER MEASUREMENT SEQUENCE — MASK MEASUREMENT SEQUENCE

FIG. 7B

DRIVE CURRENT OF WAFER MEASUREMENT SENSOR PROBE 33

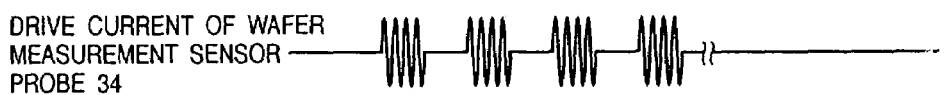

FIG. 7C

DRIVE CURRENT OF WAFER MEASUREMENT SENSOR PROBE 34

FIG. 7D

DRIVE CURRENT OF MASK MEASUREMENT SENSOR PROBE 36

FIG. 7E

DRIVE TIMING SIGNAL OF WAFER MEASUREMENT SENSOR 33

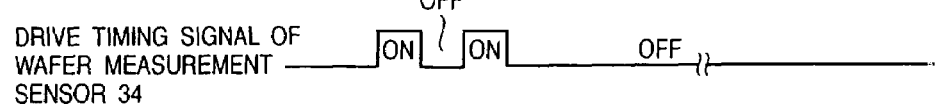

FIG. 7F

DRIVE TIMING SIGNAL OF WAFER MEASUREMENT SENSOR 34

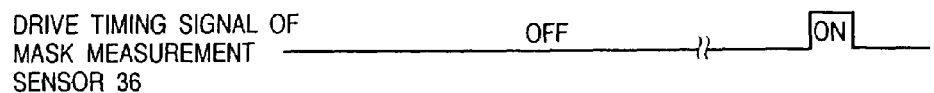

FIG. 7G

DRIVE TIMING SIGNAL OF MASK MEASUREMENT SENSOR 36

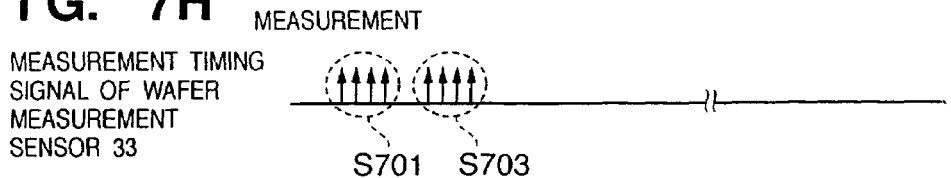

FIG. 7H

MEASUREMENT TIMING SIGNAL OF WAFER MEASUREMENT SENSOR 33

S701  S703

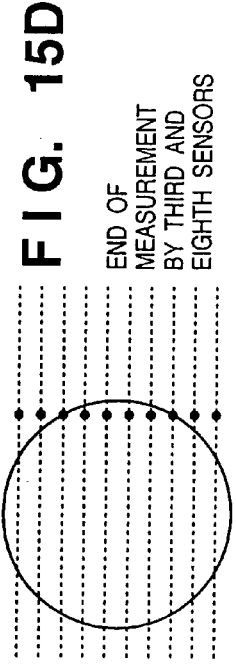
FIG. 15D
END OF MEASUREMENT BY THIRD AND EIGHTH SENSORS
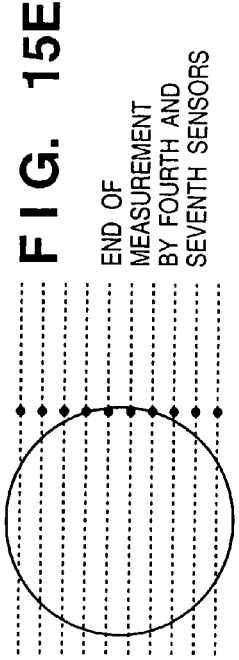
FIG. 15E
END OF MEASUREMENT BY FOURTH AND SEVENTH SENSORS
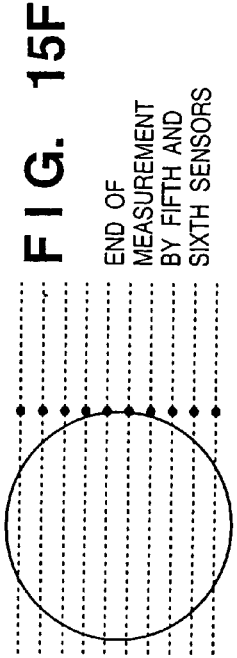
FIG. 15F
END OF MEASUREMENT BY FIFTH AND SIXTH SENSORS
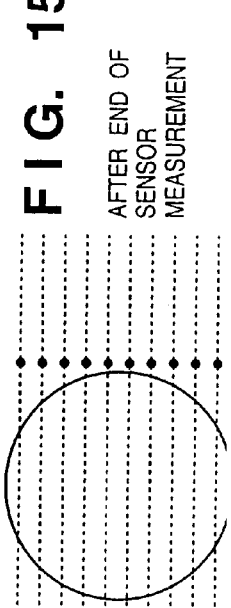
FIG. 15G
AFTER END OF SENSOR MEASUREMENT
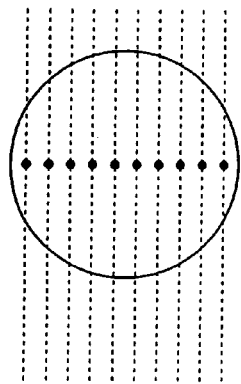
FIG. 15A
MEASUREMENT OF WAFER CENTER
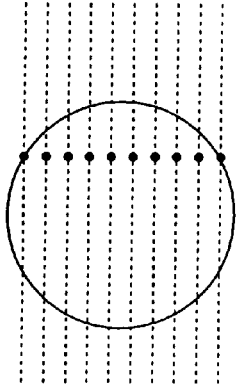
FIG. 15B
END OF MEASUREMENT BY FIRST AND 10TH SENSORS
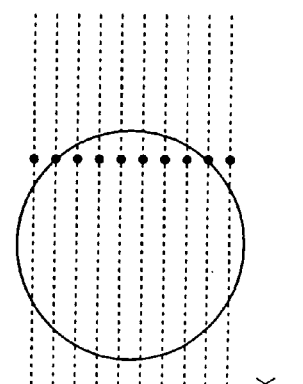
FIG. 15C
END OF MEASUREMENT BY SECOND AND NINTH SENSORS
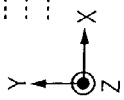

FIG. 16A DRIVE CURRENT OF FIRST SENSOR PROBE 

FIG. 16B DRIVE CURRENT OF SECOND SENSOR PROBE 

FIG. 16C DRIVE CURRENT OF THIRD SENSOR PROBE 

FIG. 16D DRIVE CURRENT OF FOURTH SENSOR PROBE 

FIG. 16E DRIVE CURRENT OF FIFTH SENSOR PROBE 

FIG. 16F DRIVE CURRENT OF SIXTH SENSOR PROBE 

FIG. 16G DRIVE CURRENT OF SEVENTH SENSOR PROBE 

FIG. 16H DRIVE CURRENT OF EIGHTH SENSOR PROBE 

FIG. 16I DRIVE CURRENT OF NINTH SENSOR PROBE 

FIG. 16J DRIVE CURRENT OF 10TH SENSOR PROBE 

GROUND CURRENT AMPLITUDE VALUE (RELATIVE VALUE)

MEASUREMENT VALUE OF FIRST SENSOR

MEASUREMENT VALUE OF SECOND SENSOR

MEASUREMENT VALUE OF THIRD SENSOR

MEASUREMENT VALUE OF FOURTH SENSOR

MEASUREMENT VALUE OF FIFTH SENSOR

FIG. 19A DRIVE CURRENT OF FIRST SENSOR PROBE 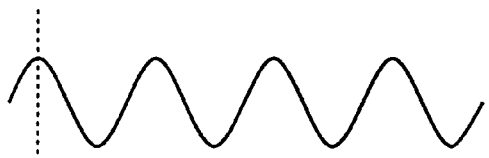

FIG. 19B DRIVE CURRENT OF SECOND SENSOR PROBE 

FIG. 19C DRIVE CURRENT OF THIRD SENSOR PROBE 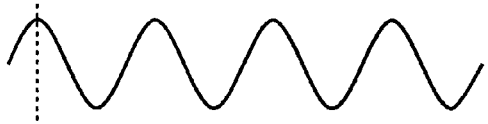

FIG. 19D DRIVE CURRENT OF FOURTH SENSOR PROBE 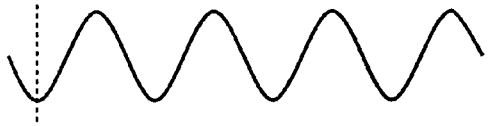

FIG. 19E DRIVE CURRENT OF FIFTH SENSOR PROBE 

FIG. 19F DRIVE CURRENT OF SIXTH SENSOR PROBE 

FIG. 19G DRIVE CURRENT OF SEVENTH SENSOR PROBE 

FIG. 19H DRIVE CURRENT OF EIGHTH SENSOR PROBE 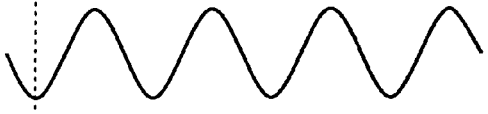

FIG. 19I DRIVE CURRENT OF NINTH SENSOR PROBE 

FIG. 19J DRIVE CURRENT OF 10TH SENSOR PROBE 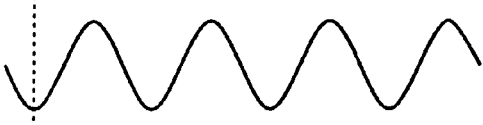

GROUND CURRENT AMPLITUDE VALUE (RELATIVE VALUE)

MEASUREMENT VALUE OF FIRST SENSOR

MEASUREMENT VALUE OF SECOND SENSOR

MEASUREMENT VALUE OF THIRD SENSOR

MEASUREMENT VALUE OF FOURTH SENSOR

MEASUREMENT VALUE OF FIFTH SENSOR

F I G. 24A
(PRIOR ART)

DRIVE CURRENT OF FIRST SENSOR PROBE

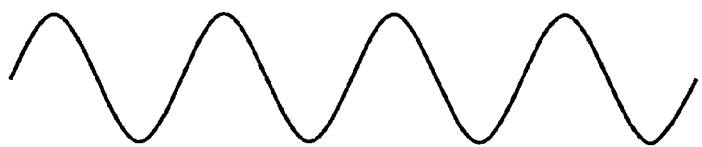

F I G. 24B
(PRIOR ART)

DRIVE CURRENT OF SECOND SENSOR PROBE

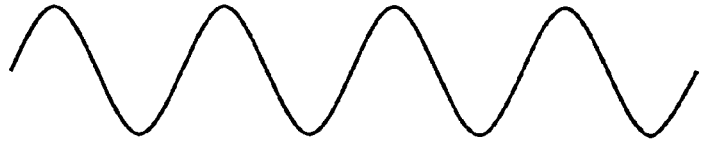

F I G. 24C
(PRIOR ART)

GROUND CURRENT

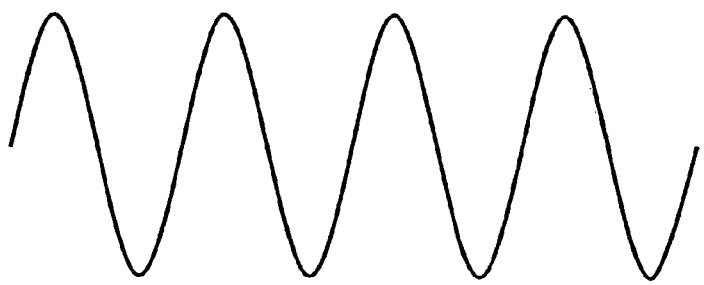

F I G. 24D
(PRIOR ART)

GROUND CURRENT AMPLITUDE VALUE (RELATIVE VALUE)

LARGE AMPLITUDE

ACTUAL AMPLITUDE VALUE

AMPLITUDE VALUE FOR ONE SENSOR

ERROR

F I G. 24E
(PRIOR ART)

MEASUREMENT VALUE OF FIRST SENSOR

LARGE INTERVAL

MEASUREMENT VALUE

TRUE VALUE

ERROR

F I G. 24F
(PRIOR ART)

MEASUREMENT VALUE OF SECOND SENSOR

LARGE INTERVAL

MEASUREMENT VALUE

TRUE VALUE

ERROR

ELECTROSTATIC CAPACITANCE SENSOR TYPE MEASUREMENT APPARATUS

FIELD OF THE INVENTION

The present invention relates to an apparatus which measures, e.g., the position and shape of a target by using an electrostatic capacitance sensor. The measurement apparatus is suitably applied to an exposure system which transfers the pattern of a master (e.g., a mask or reticle) onto a substrate (e.g., a semiconductor wafer or glass plate) or a three-dimensional object.

BACKGROUND OF THE INVENTION

One of methods of precisely measuring the position and shape of a sample (target) uses an electrostatic capacitance sensor (e.g., see Japanese Patent Laid-Open No. 11-230704). According to this method, the magnitude or change amount of an electrostatic capacitance generated between a sensor probe (electrode) and a target is detected to measure the distance between the sensor probe and the target. The electrostatic capacitance is detected as an AC impedance.

FIGS. 22A and 22B show the arrangement of a measurement apparatus according to related art using an electrostatic capacitance sensor. More specifically, the measurement apparatus comprises first and second electrostatic capacitance sensors (sensor probes) 101 and 102, first and second sensor amplifiers 11 and 12 which are electrically connected to the sensors 101 and 102 via connection cables 103, a controller 113 which receives measurement values from the first and second sensor amplifiers 11 and 12, and an oscillator 114 which outputs in-phase drive currents to the first and second sensor amplifiers 11 and 12. Weak AC currents from terminals 11a and 12a of the sensor amplifiers 11 and 12 are supplied from the sensor probes 101 and 102 to a target 104. A voltage drop by the impedance is measured to simultaneously measure distances "gap" between the sensor probes and the target at a plurality of measurement points on the target 104.

Currents flowing from the first and second sensor probes 101 and 102 to the target 104 flow back to terminals 11b and 12b of the sensor amplifiers via conductors which are set to almost the same potential as the housing ground of the apparatus.

In general, an electrostatic capacitance to be measured is a small value in pF order, and is readily influenced by the stray capacitance. The potential is generally so set as to reduce the influence of the stray capacitance on packaging from a sensor amplifier to a sensor probe and packaging from a target to a ground line.

The electrostatic capacitance sensor is ideally used by coupling a target sufficiently low in impedance to ground at low impedance. For this purpose, as shown in FIGS. 22A and 22B, a chuck 105 which chucks the target 104 is generally formed from a conductor such as a metal, and is grounded. In addition, a mount (base) 106 which supports the chuck 105 is insulated.

The sensor probes 101 and 102 are held by a holding member 107 extending from the surface of the chuck 105 such that the sensor probes 101 and 102 face the surface of the target 104.

In the use of a plurality of electrostatic capacitance sensors, an electrostatic field interference must be prevented by, e.g., setting the distance between sensor probes large enough. If the target has a sufficiently low internal impedance and is grounded at sufficiently low impedance, the interference between the sensors can be substantially ignored.

When the measurement target of the electrostatic capacitance sensor is a semiconductor or the like, the target has a high internal impedance. The target may not be able to be grounded at low impedance. In this case, AC currents flow from a plurality of sensor probes into the internal impedance of the target and the ground impedance which are common impedances. Voltage drops at these portions produce errors in sensors (each sensor is comprised of a sensor amplifier and sensor probe).

In the electrostatic capacitance sensor of FIG. 23, Z3 and Z4 function as impedances common to a plurality of sensors. The first and second sensors interfere with each other, and a voltage drop by a sensor current makes, appearing as a measurement error.

A measurement error by the sensor drive phase and ground impedance in the measurement apparatus of related art will be explained with reference to FIGS. 24A to 24F. The drive currents of the first and second sensor probes are in phase, and almost the sum of the two currents flows as a ground current into a common impedance, generating a voltage drop. The voltage drop appears between the terminals (between the terminals 11a and 11b and the terminals between the terminals 12a and 12b) of the sensor amplifiers 11 and 12, resulting in a measurement error in each sensor.

SUMMARY OF THE INVENTION

It is an object of the present invention to suppress an interference and error between sensors caused by the electrical characteristic of a target in measuring the target by using a plurality of electrostatic capacitance sensors.

It is another object of the present invention to prevent a measurement error which is generated by a common impedance or the electrostatic field interference between sensors in a measurement apparatus having a plurality of electrostatic capacitance sensors.

To solve the above problems, according to the present invention, there is provided a measurement apparatus which measures a distance between a sensor probe and a target to be measured by using an electrostatic capacitance sensor, comprising first and second sensor probes which are arranged at respective predetermined gaps to the target, and first and second sensor amplifiers which are connected respectively to the first and second sensor probes, wherein when the distance between the target and the first or second sensor probe is measured, said first amplifier supplies a first current with the first sensor probe and said second amplifier supplies a second current which is different phase and/or amplitude from the first current.

According to the present invention, there is provided a measurement apparatus which measures a distance between a sensor probe and a target to be measured by using an electrostatic capacitance sensor, comprising first, second and third sensor probes which are arranged at respective predetermined gaps to the target and a sensor amplifier which supplies a current to the sensor probes and output a measurement result, wherein the sensor amplifier supplies a firs current to the first sensor probe, a second current to the second sensor probe and a third current to the third sensor probe and the phases of the first, second and third current are set to be different by 120°.

As described above, the present invention can suppress the interference or error between sensors caused by the electrical characteristic of a target in measuring the target by using a plurality of electrostatic capacitance sensors.

In a measurement apparatus having a plurality of electrostatic capacitance sensors, a measurement error generated by a common impedance or the electrostatic field interference between the sensors can be prevented. This leads to, for example, a small line width, high line width control precision, high throughput, and a compact low-cost exposure apparatus in semiconductor exposure/transfer. The use of a plurality of measurement sensors can increase the throughput, providing a higher-productivity apparatus.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 3A to 3F are timing charts showing the measurement timing of the measurement apparatus according to the first embodiment of the present invention;

FIG. 4 is a view showing the arrangement of a measurement apparatus according to the second embodiment of the present invention;

FIGS. 7A to 7H are timing charts showing the measurement timing of the measurement apparatus according to the second embodiment of the present invention;

FIGS. 15A to 15G are views showing the relationship between the operation of the measurement apparatus and the stage position according to the fourth embodiment of the present invention;

FIGS. 16A to 16J are timing charts (example 1) showing the phase waveforms of the drive currents of respective sensor probes in the measurement apparatus according to the fourth embodiment of the present invention;

FIGS. 19A to 19J are timing charts (example 2) showing the phase waveforms of the drive currents of the respective sensor probes in the measurement apparatus according to the fourth embodiment of the present invention;

FIGS. 24A to 24F are timing charts showing the relationship between the sensor drive current phase and the measurement precision in the measurement apparatus according to related art.

DETAILED DESCRIPTION OF THE PREFERRED EMBODIMENTS

Preferred embodiments of the present invention will be described in detail below with reference to the accompanying drawings.

[First Embodiment]

The first embodiment in which a measurement apparatus according to the present invention is applied to measurement of the position of a semiconductor wafer will be described.

Figure 1A:
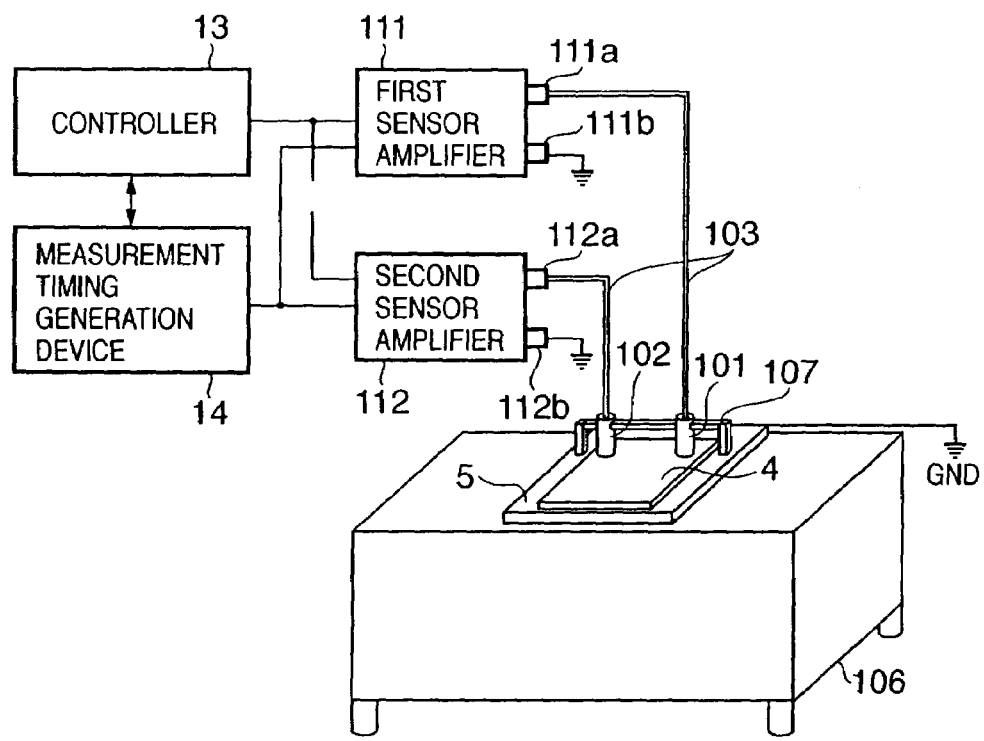
FIGS. 1A and 1B are views showing the arrangement of a measurement apparatus according to the first embodiment of the present invention.
Figure 1B:
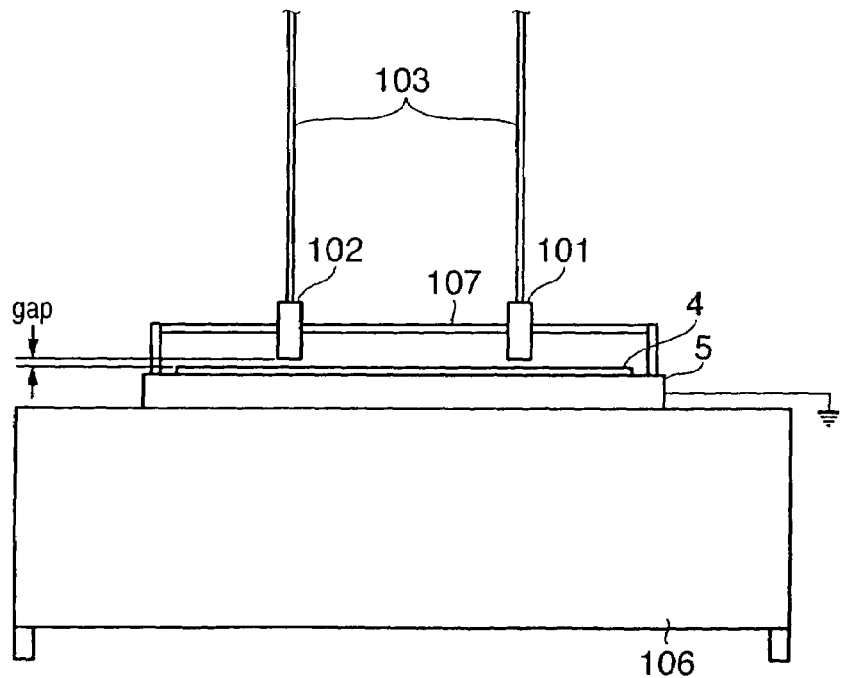
Figure 22A:
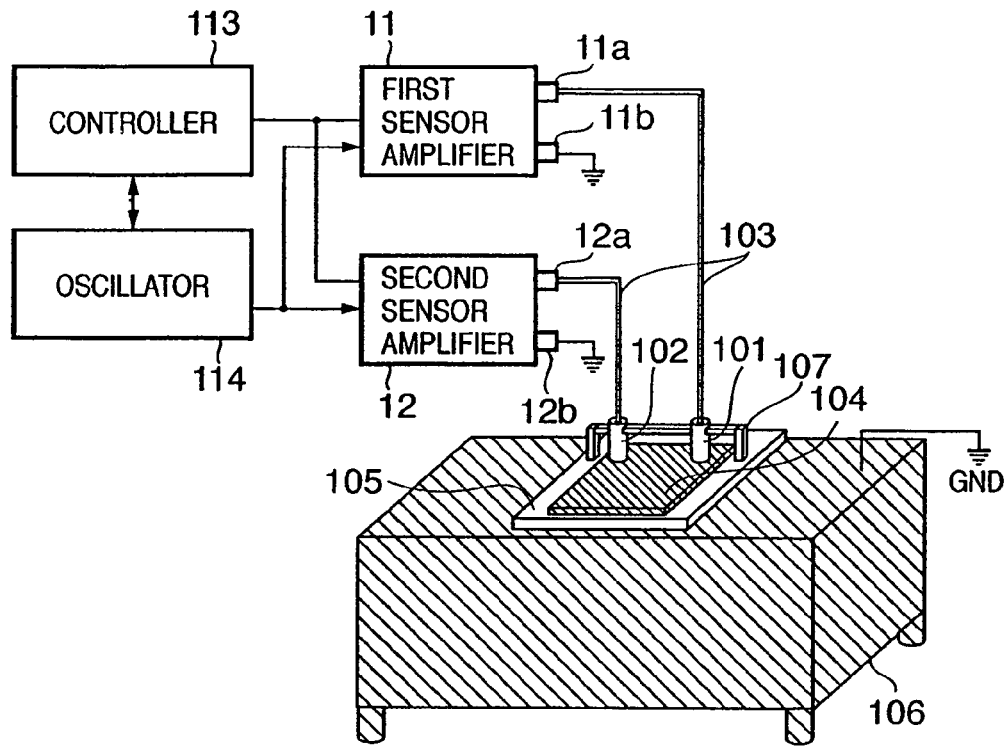
FIGS. 22A and 22B are views showing the arrangement of a measurement apparatus according to related art.
Figure 22B:
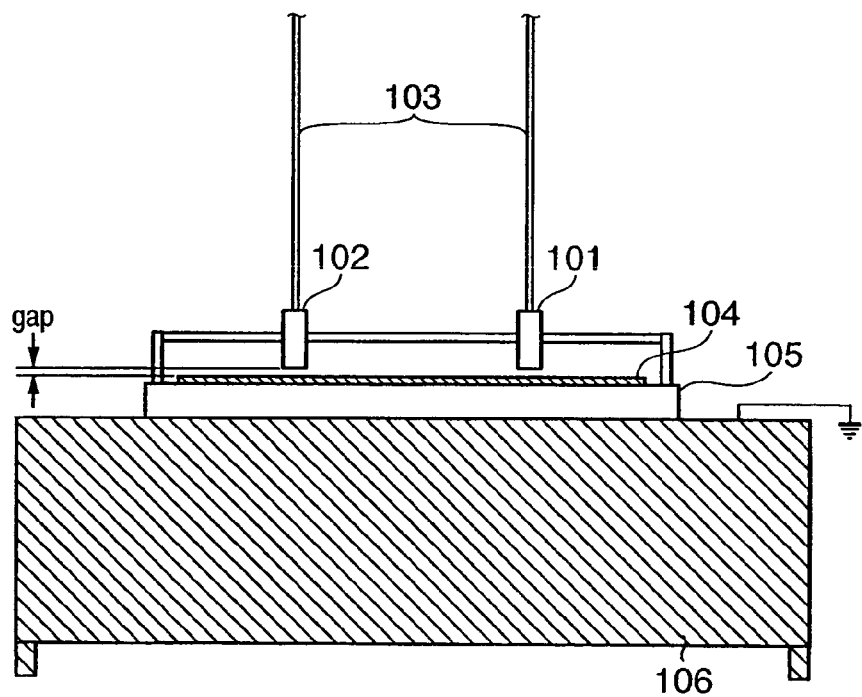
Figure 23:
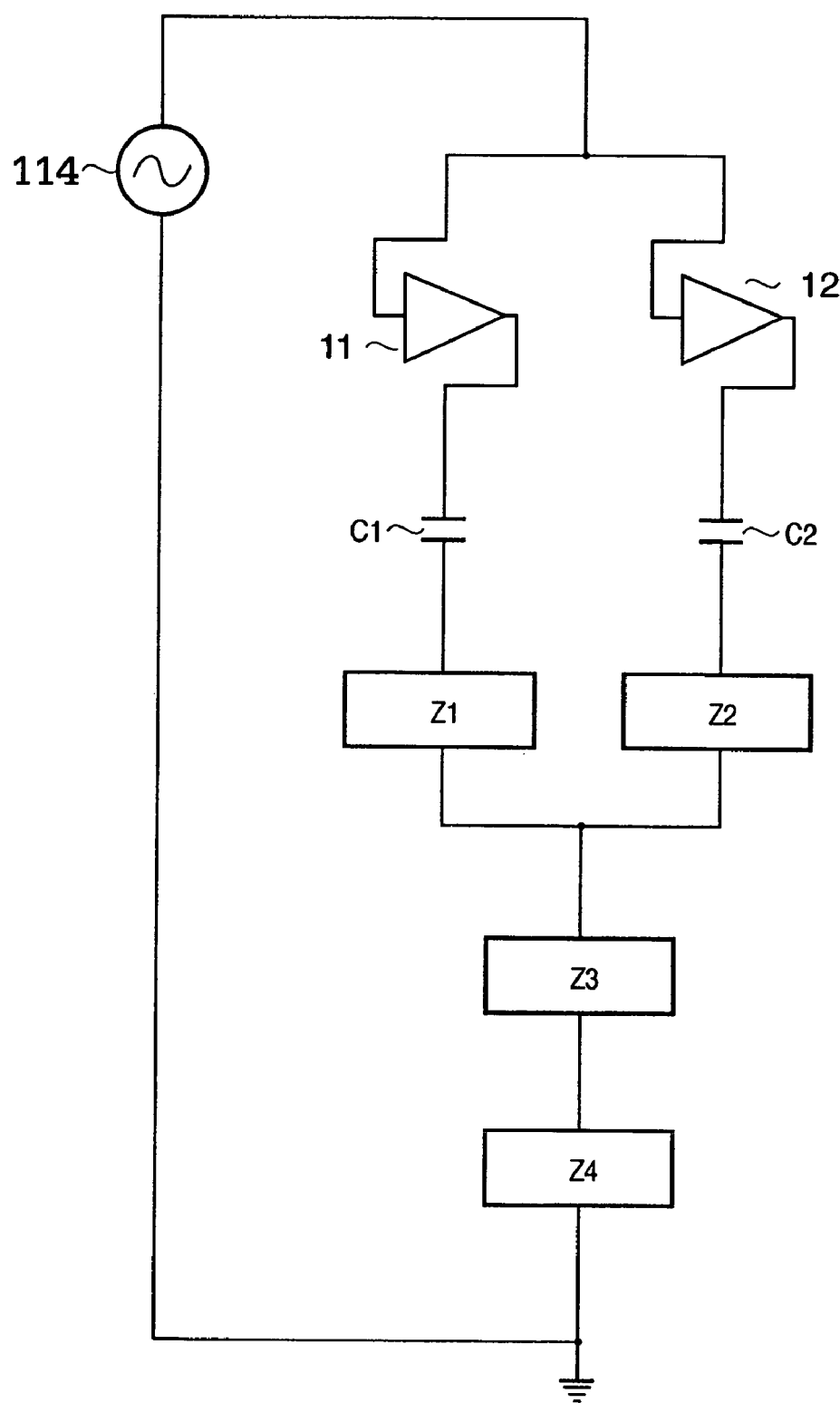
FIG. 23 is a circuit diagram showing the equivalent circuit of an electrostatic sensor measurement system in the measurement apparatus according to related art.

FIGS. 1A and 1B are views showing the arrangement of a measurement apparatus according to the first embodiment of the present invention. The same reference numerals as in the arrangement shown in FIGS. 22A and 22B denote the same parts. A description of the same parts as in the arrangement shown in FIGS. 22A and 22B will be omitted.

The measurement apparatus according to the first embodiment measures the surface level and inclination of a semiconductor wafer 4 serving as a target vacuum-chucked onto an SiC ceramic vacuum chuck 5 by using a plurality of (e.g., two) first and second sensor probes 101 and 102 fixed to a holding member 107.

Intervals "gap" between the first and second sensor probes 101 and 102 and the target 4 will be referred to as measurement gaps. The setting of the measurement gap changes depending on the type of sensor probe. In the first embodiment, the measurement gap is set to about 300 μm or less, and preferably about 200 to 300 μm.

The sensor probes 101 and 102 are cylindrical, and have a three-layered structure of a central electrode, guard electrode, and external electrode concentrically from the center when viewed from a radial section. Electrodes used for measurement are the central electrodes, and the central electrodes are connected to central electrode terminals 111a and 112a of sensor amplifiers 111 and 112. A sine-wave constant-amplitude current of several ten kHz is supplied from the sensor amplifiers 111 and 112 to the central electrodes. The current flows into housing ground GND via the target 4 capacitively coupled to the sensor probes 101 and 102.

The housing ground GND is connected to ground terminals 111b and 112b of the sensor amplifiers 111 and 112, forming a closed circuit as a whole. The sensor amplifiers 111 and 112 detect voltages between the central electrode terminals 111a and 112a and the ground terminals 111b and 112b to measure the impedance of the closed circuit including the capacitive impedance of the measurement gap.

Figure 2:
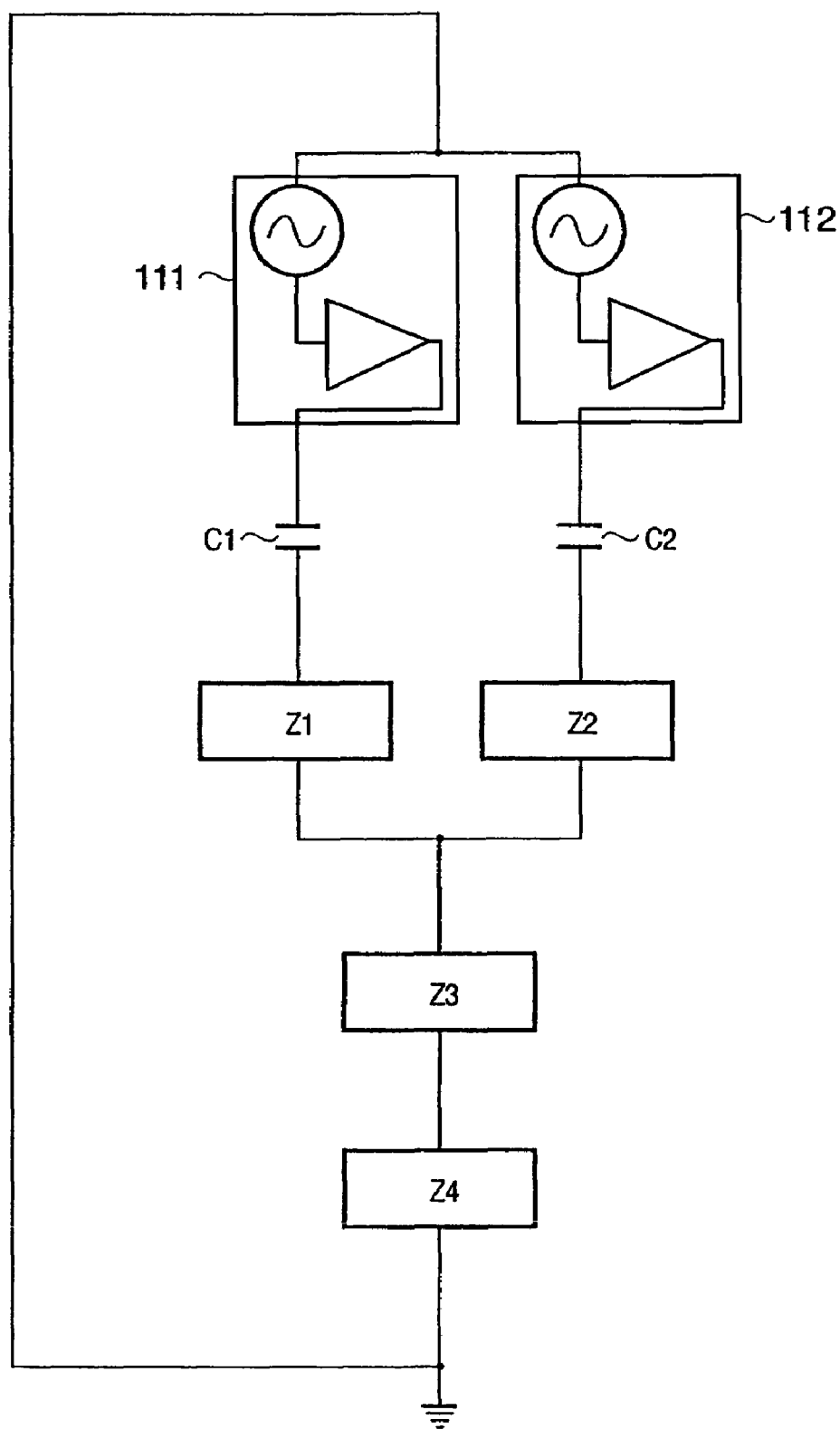
FIG. 2 is a circuit diagram showing the equivalent circuit of an electrostatic sensor measurement system in the measurement apparatus according to the first embodiment of the present invention.

FIG. 2 is a circuit diagram showing the equivalent circuit of an electrostatic sensor measurement system in the measurement apparatus according to the first embodiment.

In FIG. 2, C1 represents the measurement gap between the first sensor probe 101 and the semiconductor wafer 4. C2 represents the measurement gap between the second sensor probe 102 and the semiconductor wafer 4. Z1 represents the internal impedance of the semiconductor wafer 4 that acts as an independent impedance component in measurement by the sensor probe 101. Z2 represents the internal impedance of the semiconductor wafer 4 that acts as an independent impedance component in measurement by the sensor probe 102. Z3 represents the internal impedance of the semiconductor wafer 4 that acts as a common impedance component in the sensor probes 110 and 102. Z4 represents the impedances of the vacuum chuck 5 and a mount 106 that act as common impedance components in the sensor probes 110 and 102.

Letting d be the measurement gap and S be the effective facing area between the sensor probe and the target, an electrostatic capacitance C of the measurement gap is given by $$C = e0 \cdot S/d$$

where e0 is the permittivity in vacuum. The permittivity in air is assumed to be almost equal to that in vacuum.

Letting ω be the angular frequency of an AC current supplied to the sensor probe and i be the current value, a voltage value e between the central electrode terminal and the ground terminal is given by $$e = i/(\omega \cdot C)$$

From the two equations, $$e = i \cdot d/(\omega \cdot e0 \cdot S)$$

$$d = e \cdot \omega \cdot e0 \cdot S/i$$

are derived. Assuming that i, ω, and S do not change, d proportional to e is obtained.

The guard electrode prevents an electric field generated by the central electrode from spreading to the periphery. The guard electrode is connected to the guard electrode terminal of the sensor amplifier. The guard electrode terminal is driven by a low-output-impedance driver at the same voltage as e. The sensor amplifier and sensor probe are connected using a coaxial cable. The central electrode is connected to the central wire of the coaxial cable, and the guard electrode is connected to the shield wire. This connection cancels the influence of the capacitance between two connection cables 103.

The first and second sensor amplifiers 111 and 112 drive the sensor probes and measure voltages. The measured voltages are A/D-converted and transmitted to a controller 13. For example, the controller 13 processes and displays measurement values. At this time, the offset, gain, nonlinearity, and the like may be corrected in the controller 13.

The vacuum chuck 5 is formed from SiC ceramic in order to prevent deformation of the chuck upon a temperature change. The mount 106 of the chuck 5 is formed from ceramic.

Most of the structure on the lower surface side of the target 4 is formed from an insulator, and the target 4 is hardly expected to be coupled to the ground GND.

The controller 13 sets in advance the measurement timing of a measurement timing generation device 14. The controller 13 receives the measurement values of the first and sensor amplifiers 111 and 112, and externally displays the measurement values via a display or the like.

The measurement timing generation device 14 outputs the drive timing signals and measurement timing signals of the sensor probes 101 and 102 to the first and second sensor amplifiers 111 and 112. The measurement timing generation device 14 also outputs the measurement timing signals to the controller 13 to provide measurement value reception timings.

The measurement timing will be explained with reference to the timing charts of FIGS. 3A to 3F.

In the first embodiment, timings are so set as not to simultaneously supply drive currents (weak currents for measurement) to the first and second sensor probes 101 and 102 (e.g., the current or voltage of the second sensor probe 102 is set to 0 in measurement by the first sensor probe 101). Alternatively, a change in a current or voltage applied to the second sensor probe 102 is set to 0 when a drive current is supplied to the first sensor probe 101 to enable measurement. Measurement by each sensor probe is performed a plurality of number of times, increasing the precision by the averaging effect.

That is, a slight time margin after the drive signal of the first sensor probe 101 is enabled, the measurement timing signal of the first sensor probe 101 is enabled a plurality of number of times to perform measurement a plurality of number of times. After the lapse of a predetermined time, the drive timing signal of the first sensor probe 101 is disabled, and after a slight time margin, the drive timing signal of the second sensor probe 102 is enabled. After a slight time margin, the measurement timing signal of the second sensor probe 102 is enabled a plurality of number of times to perform measurement a plurality of number of times. This processing is repetitively executed until a necessary number of measurement points are obtained.

Sensor probe drive currents in FIGS. 3A to 3F are represented as constant-amplitude AC sine-wave currents actually supplied to the sensor probes 101 and 102. The frequency of the sine wave in FIGS. 3A to 3F is merely schematically expressed, and the relationship between the drive timing and the measurement timing is not limited to FIGS. 3A to 3F.

The first embodiment sets sufficient time margins for the drive timing signal and measurement timing signal. If a condition that one sensor is not driven during measurement by the other sensor, the throughput can be further increased.

In a conventional measurement apparatus using a plurality of electrostatic capacitance sensors, it is difficult to realize high precision owing to the interference between the sensors. However, the first embodiment can completely eliminate the influence of the interference.

[Second Embodiment]

The second embodiment in which a measurement apparatus according to the present invention is applied to an X-ray exposure apparatus for transferring a mask pattern onto a wafer by step & repeat will be described.

FIG. 4 is a view showing the partial arrangement of an X-ray exposure apparatus including the measurement apparatus according to the second embodiment of the present invention. FIG. 4 shows a part concerning an electrostatic capacitance sensor in the overall apparatus.

The X-ray exposure apparatus according to the second embodiment is a proximity gap equal-magnification X-ray exposure apparatus using a synchrotron ring light source. In an actual use environment, the part shown in FIG. 4 is incorporated in a sealed chamber, and used in a high-purity helium atmosphere at 20 kPa.

In the second embodiment, exposure is done while a mask 21 and wafer 22 are held at a very small gap of 10 μm or less. High precision is required for measuring the levels of the wafer surface and mask surface. A set gap different from an assumed one results in serious influence on an exposure result such as degradation of the line width accuracy. To realize high throughput, the wafer is exposed by step & repeat while the exposure gap is maintained. At this time, low parallelism between the mask surface and the wafer surface leads to degradation of an exposure result and damage to the membrane due to the deformation of the mask membrane.

In the second embodiment, an X-ray emitted by a synchrotron ring light source (not shown) is guided in a direction S1 in FIG. 4. In synchronism with this, exposure is done while both the mask 21 and wafer 22 are held vertically.

A mask frame 23 is formed from SiC with a diameter of 125 mm. A 4 inch mask substrate is bonded to the mask frame 23. A membrane and absorber pattern are formed on the mask substrate. The mask substrate is etched back in the exposure area.

The mask is chucked by a mask chuck 24 shown in FIG. 4. The mask chuck 24 is mounted on a mask stage 25, and has the degree of freedom around the Z, θ, ωx, and ωy axes.

In FIG. 4, the wafer 22 is vacuum-chucked to a wafer chuck 26 by a wafer transport system (not shown). The wafer chuck 26 is formed from SiC, and has many small pins on the chuck surface. The wafer chuck 26 is mounted on a SiC wafer stage 27. The wafer stage 27 is mounted on an X stage 28, and further mounted on a Y stage 29. The Y stage 29 is clamped to a base 30. The base 30 is set on a floor 32 via dampers 31 which cut off floor vibrations. The wafer stage 27 is driven by a linear motor or the like, and has the degree of freedom around the X, Y, Z, θ, ωx, and ωy axes. The positions of the mask 21 and wafer 22 are measured by an alignment measurement unit (not shown).

The arrangement and measurement of the measurement apparatus according to the second embodiment will be explained.

After the wafer 22 is chucked, the wafer stage 27 is driven to measure lattice points at a pitch of 20 mm on the wafer 22 serving as a target to be measured, by a plurality of (e.g., two) wafer measurement electrostatic capacitance sensor probes 33 and 34. The wafer measurement electrostatic capacitance sensor probes 33 and 34 are attached to the mask frame 23 via a metal member 35.

The wafer measurement electrostatic capacitance sensor probes 33 and 34 are fixed to the mask frame 23. The wafer stage 27 is moved relatively to the wafer measurement electrostatic capacitance sensor probes 33 and 34 so as to measure all measurement points. In measurement, the wafer stage 27 need not be stopped, and a controller which drives and controls the wafer stage 27 can measure a measurement point while managing the measurement timing at the coordinate position.

The metal member 35 which holds the wafer measurement electrostatic capacitance sensor probes 33 and 34 also functions as a facing ground plate.

A mask measurement electrostatic capacitance sensor probe 36 is attached to a metal member 37 also functioning as a facing ground plate which is attached to the wafer stage 27. Only one mask measurement electrostatic capacitance sensor probe 36 is arranged. The mask stage 25 is moved relatively to the mask measurement electrostatic capacitance sensor probe 36 so as to measure all measurement points, and a plurality of points on the mask 21 serving as a target to be measured (master bearing a transfer patter) are measured.

Figure 5:
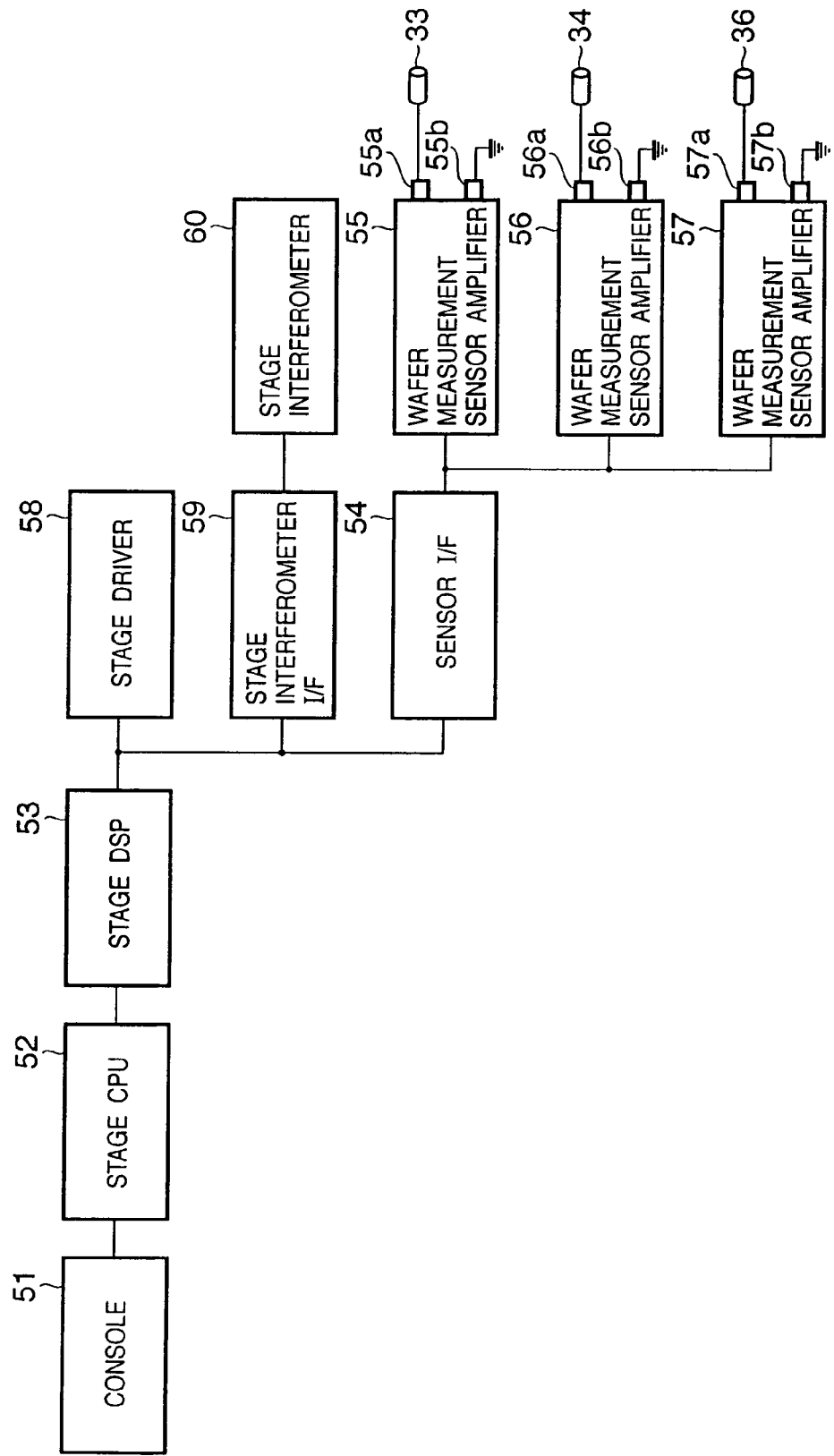
FIG. 5 is a block diagram showing the measurement apparatus according to the second embodiment of the present invention.

Both the metal members 35 and 37 are connected to the ground terminals of corresponding sensor amplifiers in FIG. 5 by using conductors. The metal members 35 and 37 are set near corresponding targets with an area as large as possible in design so as to obtain capacitive coupling enough for facing ground plates.

It is difficult to ground without any mechanical influence a substrate (e.g., wafer) supported by an insulator (e.g., the mask frame 23, wafer stage 27, or base 30) as described in the second embodiment. The ground impedance readily increases, and the substrate readily receives an interference from another sensor. To prevent this, the ground plates 35 and 36 facing the targets 21 and 22 are arranged to decrease the ground impedance by capacitive coupling.

Similar to the first embodiment, the sensor probes 33, 34, and 36 are cylindrical, and have a three-layered structure of a central electrode, guard electrode, and external electrode concentrically from the center when viewed from a radial section. Electrodes used for measurement are the central electrodes. The wafer measurement sensor probes 33 and 34 are connected to central electrode terminals 55a and 56a of sensor amplifiers 55 and 56 shown in FIG. 5. The mask measurement sensor probe 36 is connected to a central electrode terminal 57a of a sensor amplifier 57 shown in FIG. 5. A sine-wave constant-amplitude current of several ten kHz is supplied from the sensor amplifiers 55 to 57 to the central electrodes. The current flows into the metal members 35 and 37 serving as facing ground plates via the sensor probes 33, 34, and 36 and the capacitively coupled targets (wafer measurement sensor probes 33 and 34 and wafer 22, or mask measurement sensor probe 36 and mask 21).

The metal member 35 is connected to ground terminals 55b and 56b of the sensor amplifiers 55 and 56, and the metal member 37 is connected to a ground terminal 57b of the sensor amplifier 57, forming a closed circuit as a whole.

The sensor amplifiers 55 to 57 detect voltages between the central electrode terminals 55a to 57a and the ground terminals 55b to 57b to measure the impedance of the closed circuit including the capacitive impedance of the measurement gap.

Figure 6:
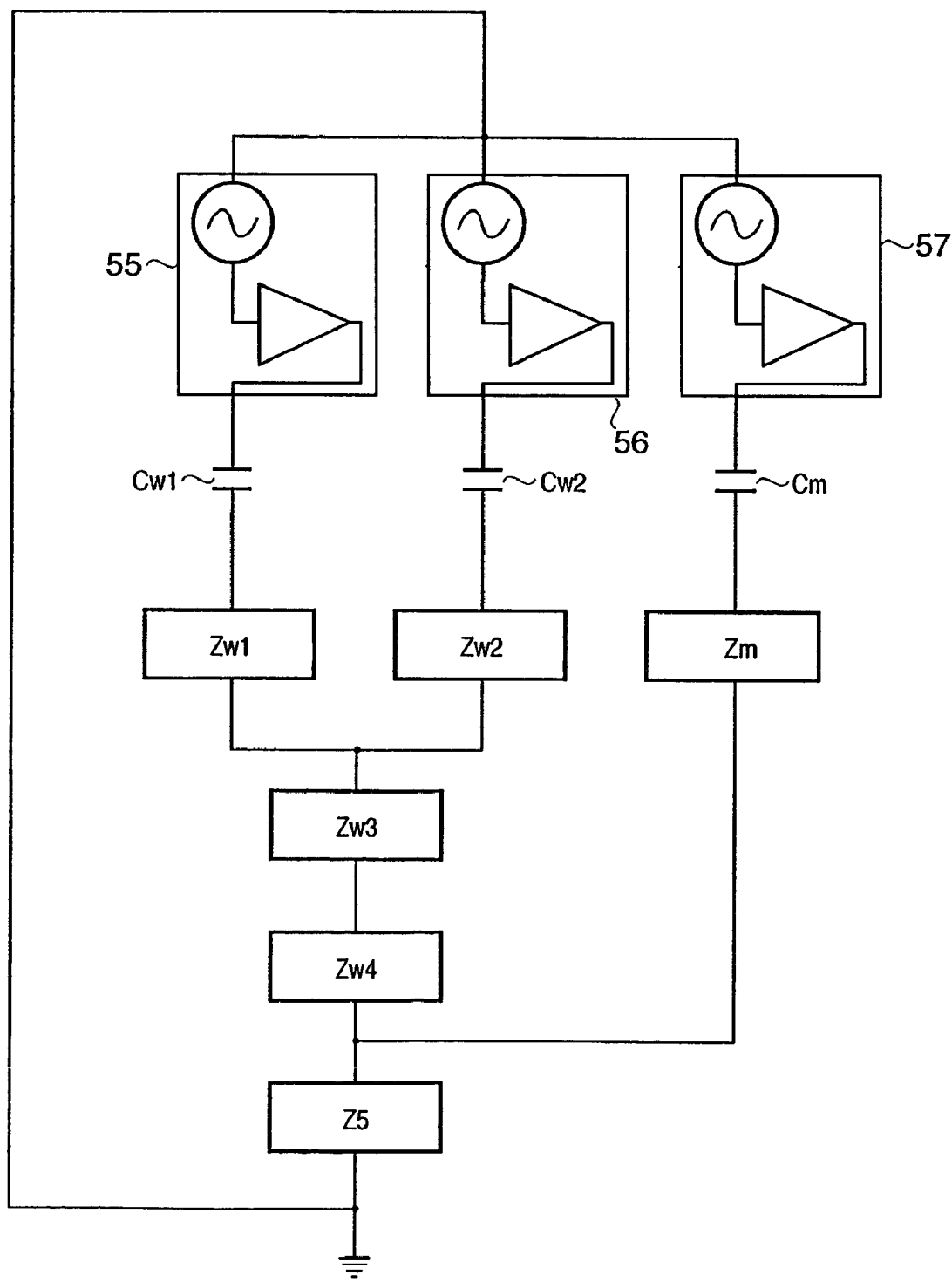
FIG. 6 is a circuit diagram showing the equivalent circuit of an electrostatic sensor measurement system in the measurement apparatus according to the second embodiment of the present invention.

FIG. 6 is a circuit diagram showing the equivalent circuit of an electrostatic sensor measurement system in the measurement apparatus according to the second embodiment.

In FIG. 6, Cw1 represents the measurement gap between the wafer measurement sensor probe 33 and the wafer 22. Cw2 represents the measurement gap between the wafer measurement sensor probe 34 and the wafer 22. Zw1 represents the internal impedance of the wafer 22 that acts as an independent impedance component in measurement by the wafer measurement sensor probe 33. Zw2 represents the internal impedance of the wafer 22 that acts as an independent impedance component in measurement by the wafer measurement sensor probe 34. Zw3 represents the internal impedance of the wafer 22 that acts as a common impedance component in the wafer measurement sensor probes 33 and 34. Zw4 represents the impedances of the wafer chuck 26, wafer stage 27, X stage 28, and Y stage 29 that acts as a common impedance component in the wafer measurement sensor probes 33 and 34. Cm1 represents the measurement gap between the mask measurement electrostatic capacitance sensor probe 36 and the mask 21. Zm represents the impedances of the mask 21, mask chuck 24, mask stage 25, and mask frame 23 that concern measurement by the mask measurement electrostatic capacitance sensor probe 36. Z5 represents the impedance of the base 30 that acts as a common impedance component in the wafer measurement sensor probes 33 and 34 and mask measurement electrostatic capacitance sensor probe 36.

The control block of the second embodiment will be described with reference to FIG. 5.

A console 51 controls the sequence of the whole exposure apparatus, and provides a user interface and network interface. A stage CPU 52 receives a sequence command from the console, and drives and controls the wafer stage 27 and mask stage 25. In addition, the exposure apparatus comprises an alignment unit, transport unit, and illumination unit (none of them are shown). Each unit is controlled by a corresponding CPU. A stage DSP 53 performs driving control and positioning control of the wafer stage 27 and mask stage 25. The stage DSP 53 executes digital control using a DSP capable of high-speed calculation.

The stage DSP 53 outputs driving control signals for the wafer stage 27 and mask stage 25 to a stage driver 58 for these stages on the basis of the measurement value of a stage interferometer 60 that is input via a stage interferometer I/F (interface) 59.

The stage DSP 53 also receives the sensor drive timing signals, measurement timing signals, and measurement values of the electrostatic capacitance sensor probes 33, 34, and 36 which are the main point of the present invention. This is an arrangement necessary to perform measurement corresponding to the moving speed in measurement and the position coordinates according to the present invention.

A sensor I/F 54 transmits the sensor drive timing signals and measurement timing signals received from the stage DSP 53 to the wafer measurement sensor amplifiers 55 and 56 and mask measurement sensor amplifier 57. The sensor amplifiers 55 to 57 control the presence/absence of currents to be supplied to the sensor probes 33, 34, and 36 in accordance with the sensor drive timing signals. The sensor amplifiers 55 to 57 receive measurement values and output them to the sensor I/F 54 in accordance with the measurement timing signals.

The measurement timing will be explained with reference to the timing charts of FIGS. 7A to 7H.

In the exposure apparatus of the second embodiment, the wafer level is measured upon loading a wafer, and the mask level is measured upon loading a mask. The wafer level and mask level are not simultaneously measured because the wafer stage position changes. The drive currents (weak currents for measurement) of the wafer measurement sensor probes 33 and 34 are set to such timings as not to flow simultaneously (e.g., in measurement by the sensor probe 33, the current or voltage of the sensor probe 34 is set to 0). Alternatively, when the drive current is supplied to the probe 33 to enable measurement, a change in a current or voltage applied to the sensor probe 34 is set to 0.

During the wafer measurement sequence, the stage DSP 53 instructs the sensor I/F 54 to enable the wafer measurement sensor drive timing signal and disable the mask measurement sensor drive timing signal. During the mask measurement sequence, the stage DSP 53 instructs the sensor I/F 54 to disable the wafer measurement sensor drive timing signal and enable the mask measurement sensor drive timing signal. This can prevent the interference between the wafer measurement sensor probes 33 and 34 and the mask measurement sensor probe 36. The wafer measurement sensor probes 33 and 34 and mask measurement sensor probe 36 measure different targets, and hardly share the ground impedance. However, electrostatic fields face each other, and the wafer measurement sensor probes 33 and 34 and mask measurement sensor probe 36 readily electrostatically interfere with each other. It is therefore very effective to prevent any interference, like the second embodiment.

The operations of the wafer measurement sensor probes 33 and 34 in the wafer measurement sequence will be explained.

The stage DSP 53 designates not to simultaneously enable the sensor drive timing signals of the wafer measurement sensor probes 33 and 34. This can prevent the interference between the sensors. Since these two sensors measure the same target, the electrostatic field interference and ground impedance interference readily occur. Hence, it is very effective to prevent any interference, like the second embodiment.

A predetermined time delay after the drive signal of the wafer measurement sensor 33 is enabled, the measurement timing signal of the wafer measurement sensor 33 is enabled a plurality of number of times. The predetermined time delay is set to ensure a time till stable measurement via a transient stage after supply of an AC current to the sensor probe starts. Measurement is done a plurality of number of times in order to increase the precision by the averaging effect. FIGS. 7A to 7H merely schematically express the drive currents of the sensor probes for descriptive convenience, and the relationship between the drive timing and the measurement timing is not limited to FIGS. 7A to 7H.

As a method of further increasing the measurement throughput in the second embodiment, the sensor drive timing signals of the wafer measurement sensor probes 33 and 34 may be enabled early. For example, the drive timing signal of the wafer measurement sensor probe 34 can be enabled immediately after the final measurement in S701 ends. At this time, the drive timing signal of the wafer measurement sensor probe 33 is disabled by the time when the drive timing signal does not influence the first measurement in S703.

Control of synchronizing the wafer measurement sensor probes 33 and 34 and stage movement in the wafer measurement sequence will be explained.

The stage DSP 53 refers to the coordinate position of the wafer stage 27 in real time. The coordinate position of the wafer stage 27 and measurement values by the sensor probes can be associated with each other in consideration of a time delay till the time when the measurement timing signals of the sensor probes 33 and 34 are output or till actual measurement.

After measurement, the stage DSP 53 creates a table for the coordinate position of the wafer stage and the measurement values of the sensor probes, and transfers the table to the stage CPU 52. The stage CPU 52 determines measurement data of a lattice point on the wafer by calculation from the table. The necessary interval of the lattice point is determined from the characteristics of the exposure apparatus, mask, and wafer. The lattice point interval in the second embodiment is, e.g., about 20 mm.

Measurement operation of the mask measurement sensor probe will be explained.

The mask stage 25 of the second embodiment does not have an X-Y stroke as large as that of the wafer stage 27. The mask measurement sensor probe 36 is moved relatively to the mask 21 by the wafer stage 27, or both the mask stage 25 and wafer stage 27 are relatively moved to measure a plurality of points on the mask 21.

The mask 21 is exchanged not so frequently, compared to exchange of the wafer 22. Even if exchange of the mask takes a long time, this hardly influences the throughput of the exposure apparatus. In the second embodiment, four points on the mask 21 are measured while the wafer stage 27 is stopped. The stage DSP 53 creates a table which associates the coordinate position of the wafer stage in measurement and the mask measurement value, and transfers the table to the stage CPU 52. The stage CPU 52 obtains the mask level and inclination by calculation from the table.

The Z, ωx, and ωy coordinates of the wafer stage in wafer exposure are determined on the basis of the obtained measurement data at the lattice point on the wafer and the mask level and inclination.

The second embodiment uses two sensors for wafer measurement and one sensor for mask measurement. However, the present invention is not limited to these numbers in terms of the gist of the present invention (for example, the present invention can also be applied to an arrangement in FIG. 11 to be described later).

According to the second embodiment, a system which executes measurement by relatively moving a target and electrostatic capacitance sensor can efficiently perform measurement in accordance with the position coordinates and/or moving speed. This results in a small line width, high line width control precision, high throughput, and a compact low-cost exposure apparatus in semiconductor exposure/transfer. The use of a plurality of measurement sensors can increase the throughput, providing a higher-productivity apparatus.

[Third Embodiment]

Figure 8A:
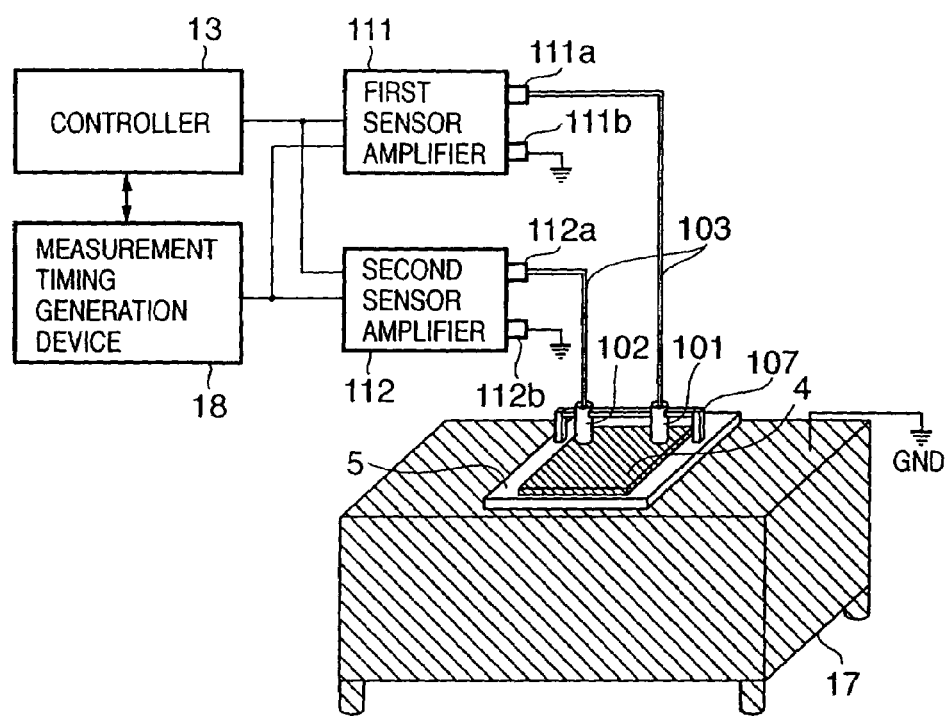
FIGS. 8A and 8B are views showing the arrangement of a measurement apparatus according to the third embodiment of the present invention.
Figure 8B:
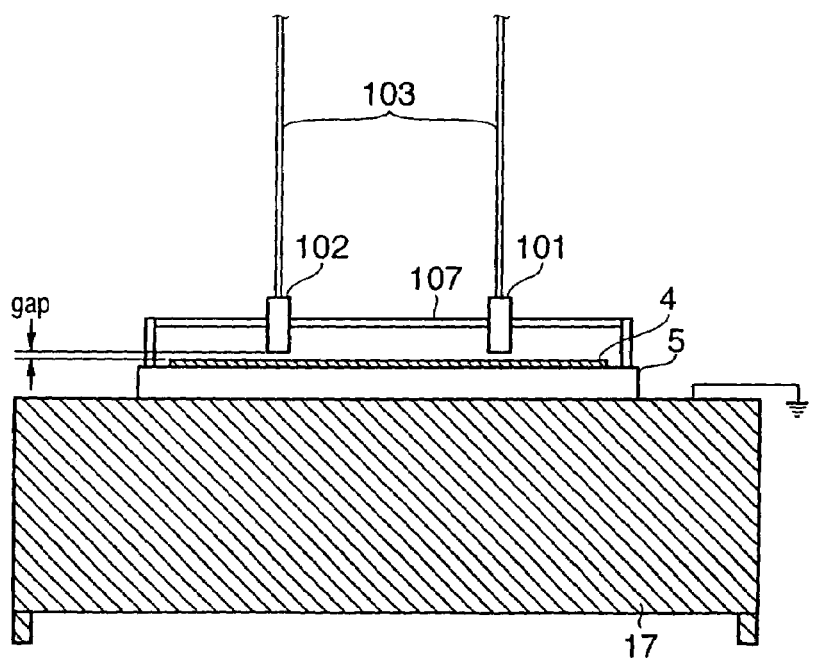

A measurement apparatus according to the third embodiment of the present invention will be described with reference to FIGS. 8A and 8B. FIGS. 8A and 8B are views showing the arrangement of the measurement apparatus according to the third embodiment. FIG. 8A is a perspective view showing the whole arrangement, and FIG. 8B is a side view showing the main part. The same reference numerals as in the arrangement shown in FIGS. 1A and 1B denote the same parts. A description of the same parts as those in the arrangement shown in FIGS. 1A and 1B will be omitted.

In the third embodiment, a chuck 5 is set on a metal base 17, and the metal base 17 is grounded.

A target 4 is grounded by capacitive coupling of a capacitance formed by sandwiching the chuck 5 between the target 4 and the metal base 17. This arrangement is so designed as to satisfy the measurement precision in the use of only one sensor. However, the capacitive coupling portion exists as an impedance common to first and second sensor probes 101 and 102.

In FIGS. 8A and 8B, a controller 13 sets the drive phase of each sensor in a phase control device 18 in advance. The controller 13 receives measurement values from first and second sensor amplifiers 111 and 112, and externally displays the measurement values.

The phase control device 18 outputs sensor drive timing signals and sensor measurement timing signals to the first and second sensor amplifiers 111 and 112. The sensor drive timing signal is 2 kHz. In the third embodiment, the sensor measurement timing signals of the first and second sensors are identical. The phase control device 18 also outputs the sensor measurement timing signals to the controller 13 to provide measurement value reception timings.

Figure 9:
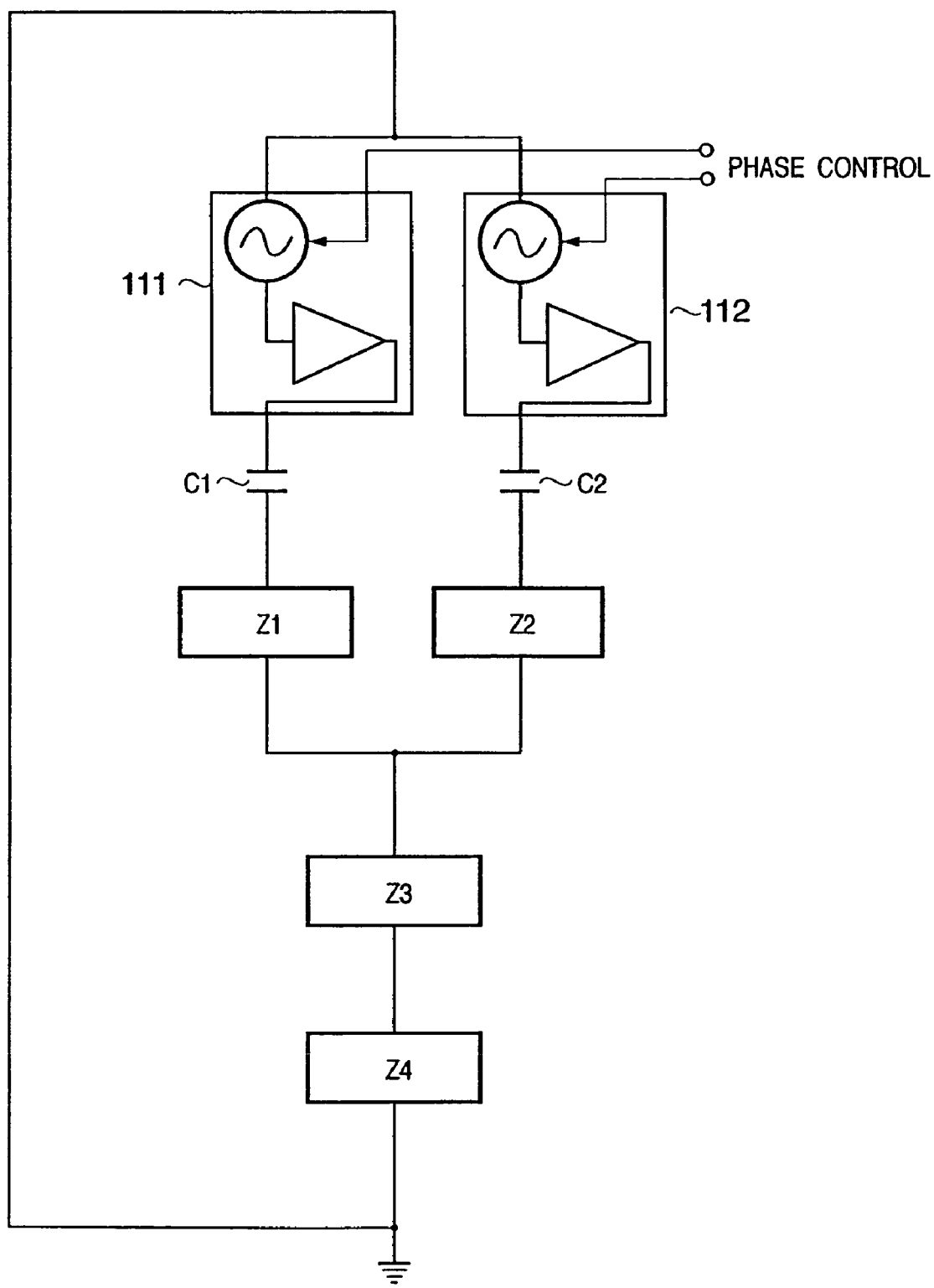
FIG. 9 is a circuit diagram showing the equivalent circuit of an electrostatic sensor measurement system in the measurement apparatus according to the third embodiment of the present invention.
Figure 10:
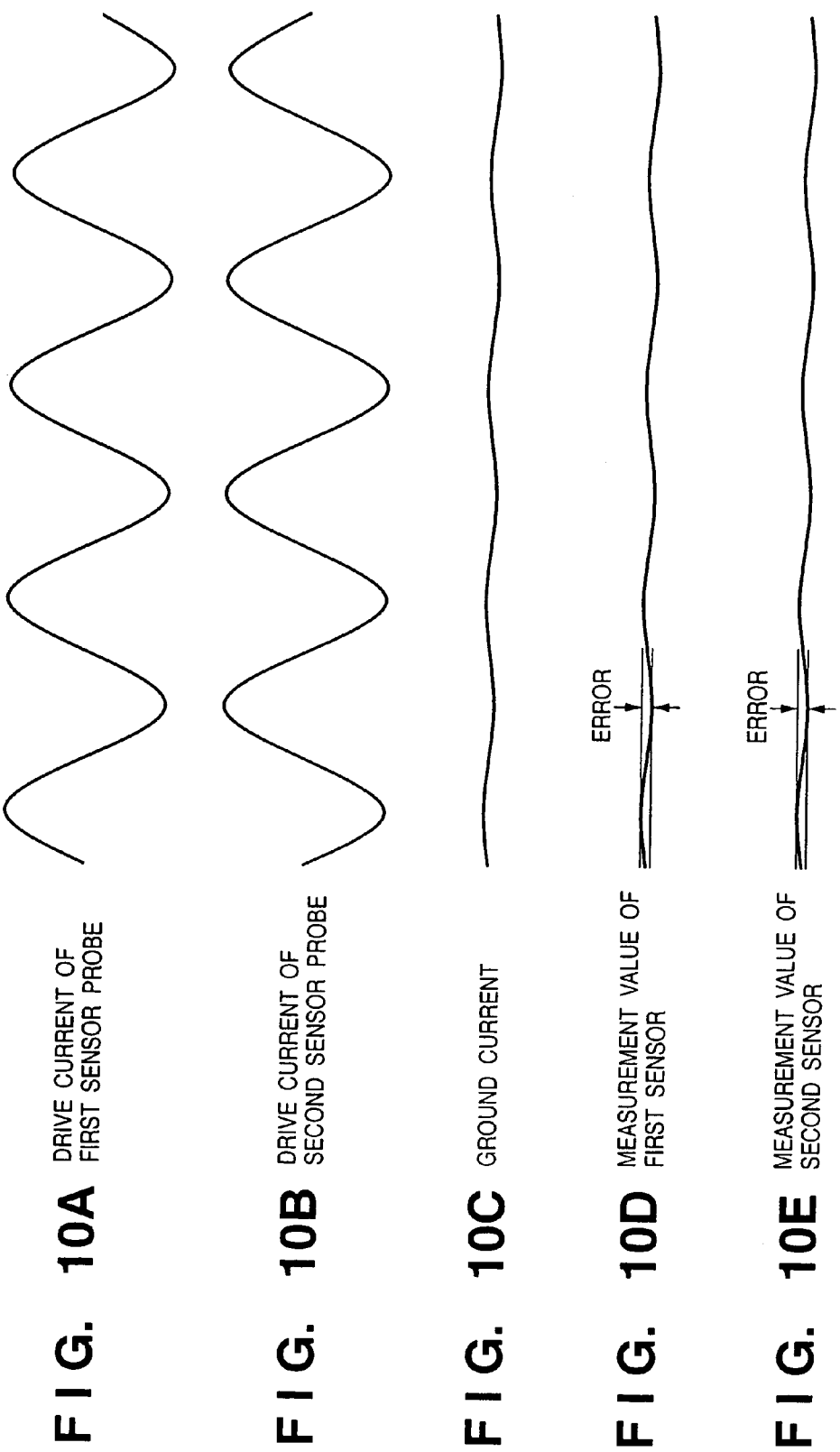
FIGS. 10A to 10E are timing charts showing the relationship between the sensor drive current phase and the measurement precision in the measurement apparatus according to the third embodiment of the present invention.

FIG. 9 is a circuit diagram showing the equivalent circuit of an electrostatic sensor measurement system in the measurement apparatus according to the third embodiment. The feature of the third embodiment is to arrange a means for controlling the sensor drive phase for the first and second sensor amplifiers 111 and 112, compared to the related art.

The sensor drive phase and measurement precision in the third embodiment will be explained with reference to FIGS. 10A to 10E. FIGS. 10A to 10E are timing charts showing the drive current, ground current, and sensor measurement value of the sensor probe in the measurement apparatus according to the third embodiment.

In the third embodiment, the phase difference between the drive currents (weak currents for measurement) of the first and second sensors is set to 180°. This phase difference cancels currents flowing through a common impedance. The ground current in FIGS. 10A to 10E is not completely 0. This is a residue generated because the ground currents of the first and second sensors do not completely coincide with each other. A measurement error whose value corresponds to the residue is generated, but the error can be greatly reduced from that of related art (see FIGS. 24A to 24F).

The phase difference between sensors that is set by the controller 13 is not limited to 180°, and can be arbitrarily set. The phase difference can be set to one which maximizes the measurement precision. For example, attention can be given to the repetitive reproducibility of measurement. In this case, data is acquired for a set phase, and the controller 13 determines an optimal phase.

As another method, when the interference between sensors cannot be satisfactorily adjusted by only the phase, the current values of the sensors can be slightly increased/decreased to more accurately cancel the ground current. As still another method, not the phase but the current amplitude value may be changed between sensors to cancel the ground current.

In the third embodiment, the two, first and second sensors measure the same target. Even when sensors which measure different targets interfere with each other, the measurement precision can be increased by the same means as that of the third embodiment.

In a conventional measurement apparatus using a plurality of electrostatic capacitance sensors, it is difficult to realize high precision owing to the interference between the sensors. As described above, however, the third embodiment can reduce the influence of the interference.

[Fourth Embodiment]

An X-ray stepper which transfers a mask pattern to a wafer by step & repeat will be described as the fourth embodiment of the present invention.

Figure 11:
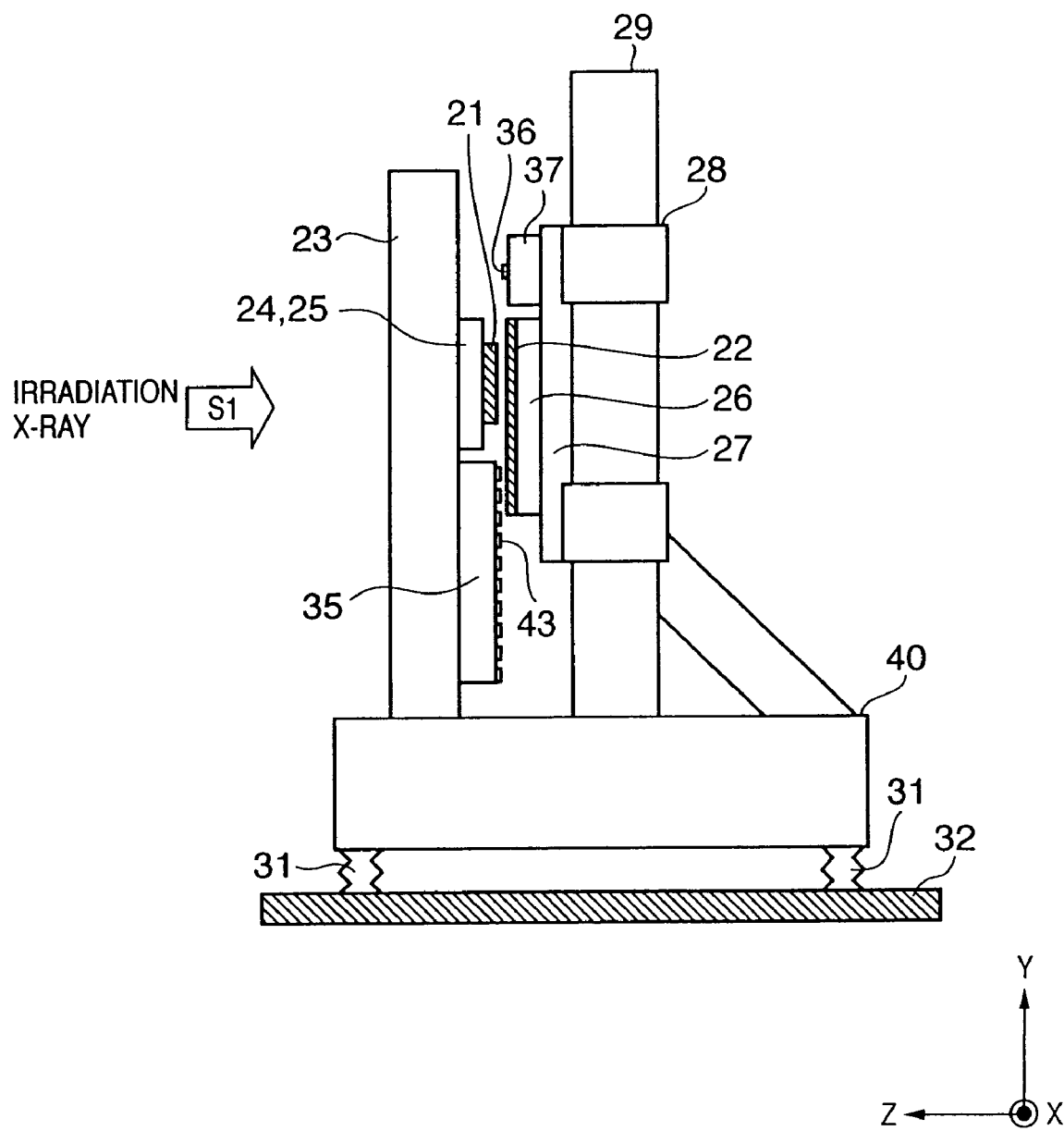
FIG. 11 is a view showing the arrangement of a measurement apparatus according to the fourth embodiment of the present invention.

FIG. 11 is a view showing the partial arrangement of an X-ray exposure apparatus including a measurement apparatus according to the fourth embodiment of the present invention. The same reference numerals as in the arrangement shown in FIG. 4 denote the same parts. A description of the same parts as in the arrangement shown in FIG. 4 will be omitted.

As shown in FIG. 11, a circular wafer 32 having a diameter of 200 mm is a target in the fourth embodiment. Ten wafer measurement electrostatic capacitance sensor probes 43 are arranged in the Y direction. A wafer stage 27 is driven in the X direction so as to measure all measurement points serving as lattice points, and the measurement points are measured. The Y coordinate in measurement is a predetermined one. In measurement, the wafer stage 27 need not be stopped, and the controller of the wafer stage 27 can measure a measurement point while managing the measurement timing at the coordinate position and driving the wafer stage 27.

Figure 12:
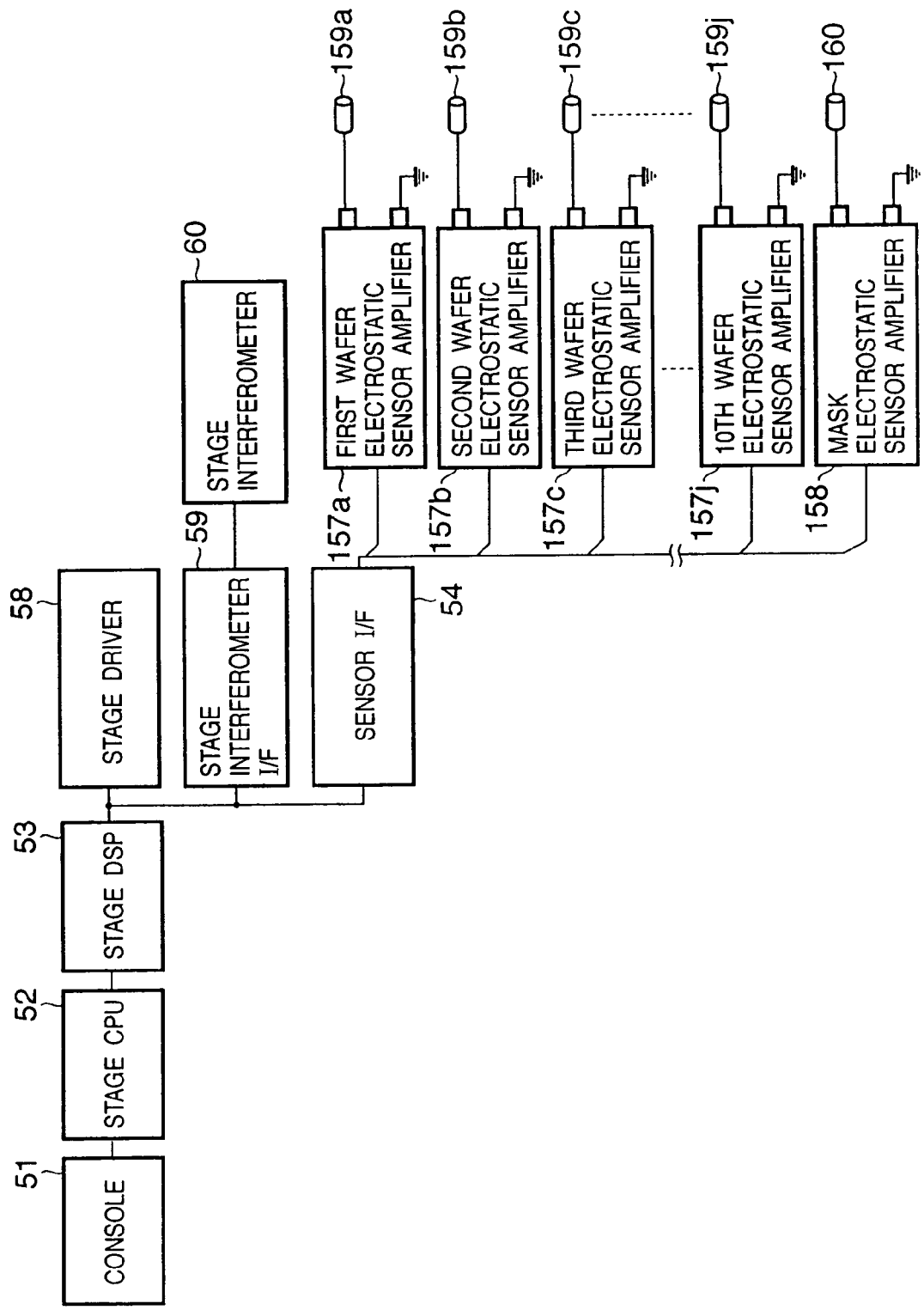
FIG. 12 is a block diagram showing the measurement apparatus according to the fourth embodiment of the present invention.

The control block of the fourth embodiment will be described with reference to FIG. 12. FIG. 12 is a block diagram showing the X-ray exposure apparatus according to the fourth embodiment. The same reference numerals as in the arrangement shown in FIG. 5 denote the same parts. A description of the same parts as in the arrangement shown in FIG. 5 will be omitted.

A stage DSP 53 receives the sensor drive phase instruction, measurement timing instruction, and measurement value of an electrostatic capacitance sensor as the main point of the fourth embodiment. A sensor I/F 54 outputs drive signals to first to 10th wafer electrostatic sensor amplifiers 157a to 157j and a mask electrostatic sensor amplifier 158 in accordance with a sensor drive phase instruction received from the stage DSP 53. The sensor I/F 54 transmits measurement timing instructions to the electrostatic sensor amplifiers 157a to 157j and 158. The electrostatic sensor amplifiers 157a to 157j and 158 control supply currents to first to 10th wafer sensor probes 159a to 159j and a mask sensor probe 160 in accordance with sensor drive signals. The electrostatic sensor amplifiers 157a to 157j and 158 receive measurement values and output them to the sensor I/F 54 in accordance with sensor measurement timing signals.

Figure 13:
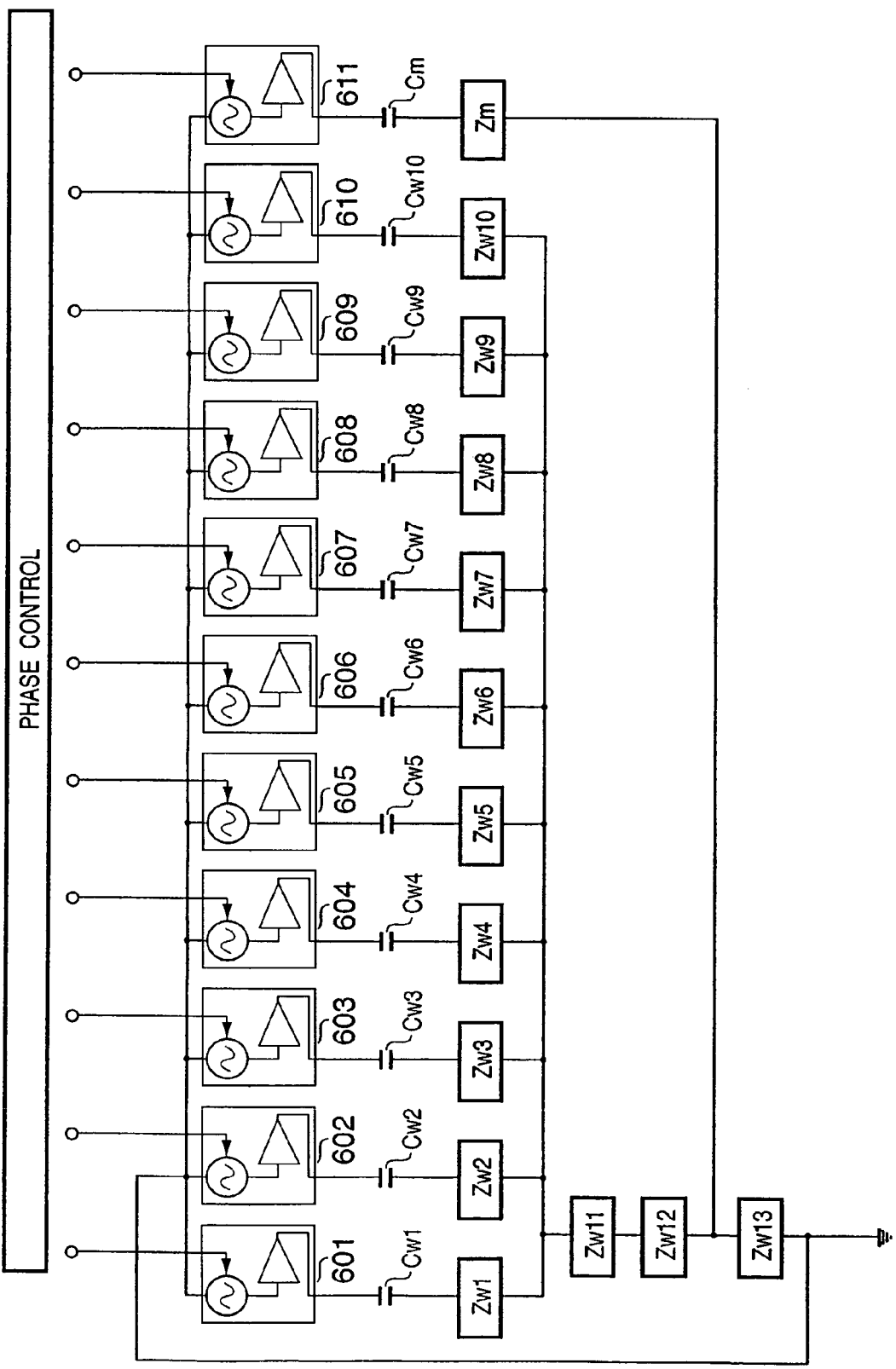
FIG. 13 is a circuit diagram showing the equivalent circuit of an electrostatic sensor measurement system in the measurement apparatus according to the fourth embodiment of the present invention.
Figure 14A:
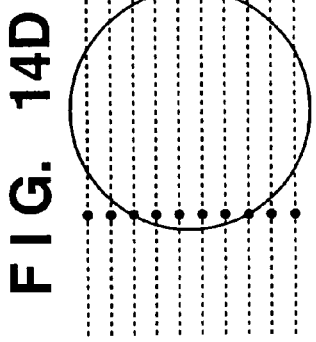
FIGS. 14A to 14F are views showing the relationship between the operation of the measurement apparatus and the stage position according to the fourth embodiment of the present invention.
Figure 14B:
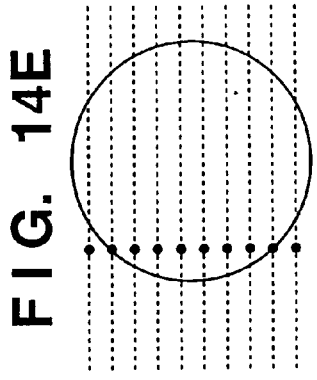
Figure 14C:
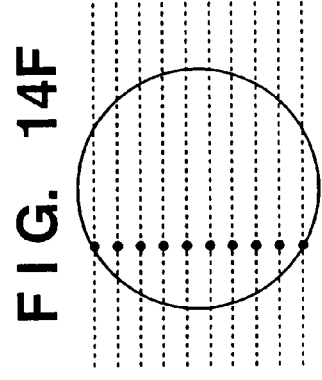
Figure 14D:
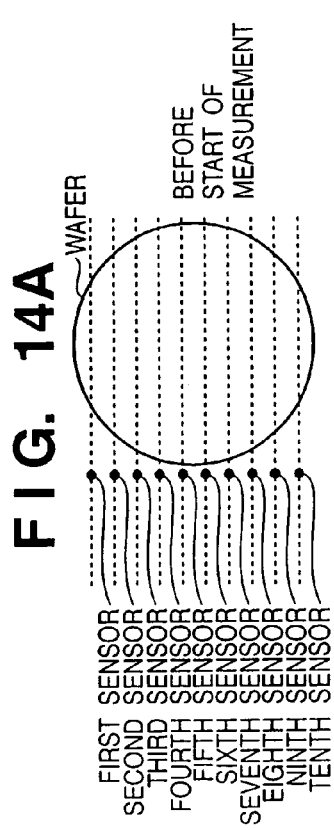
Figure 14E:
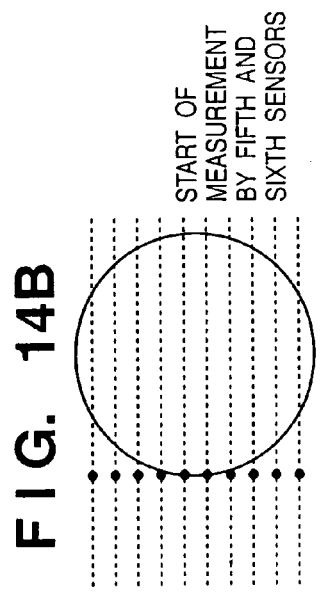
Figure 14F:
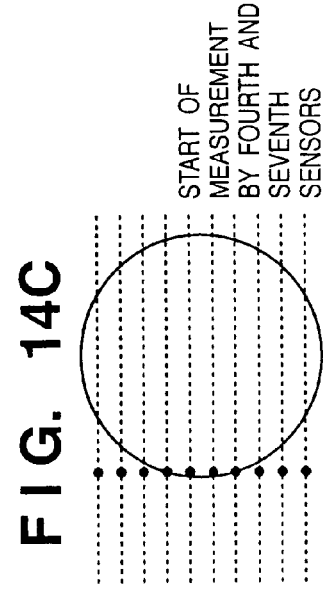
Figure 17A:
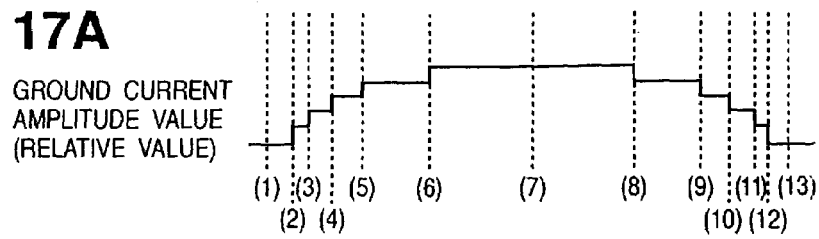
FIGS. 17A to 17F are timing charts (example 1) showing the ground current and measurement error of the measurement apparatus according to the fourth embodiment of the present invention.
Figure 17B:
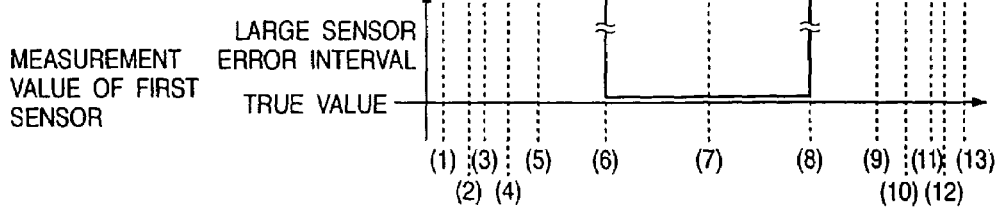
Figure 17C:
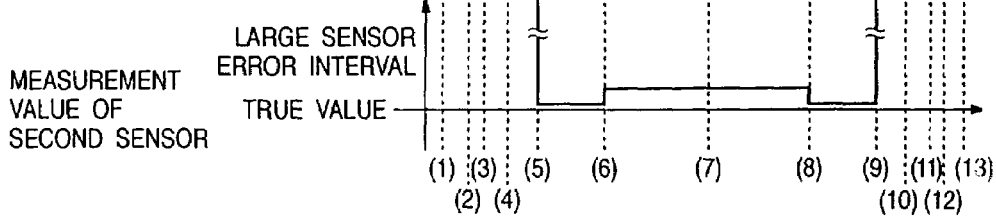
Figure 17D:
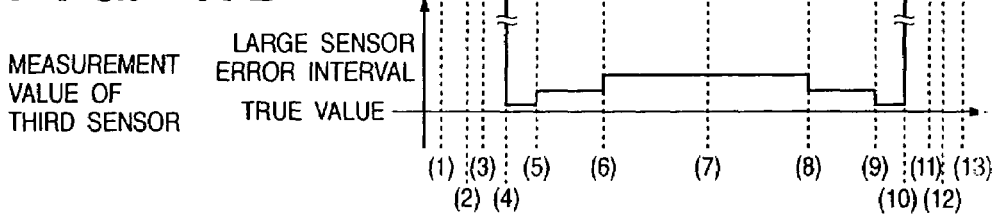
Figure 17E:
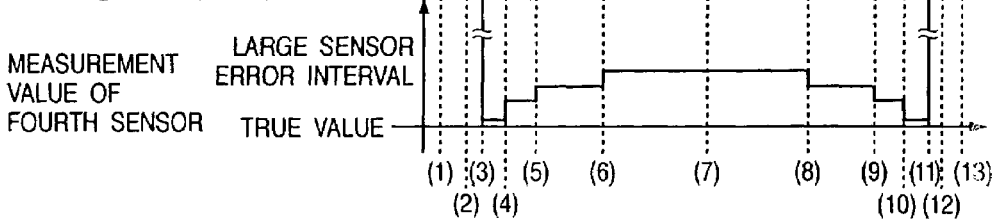
Figure 17F:
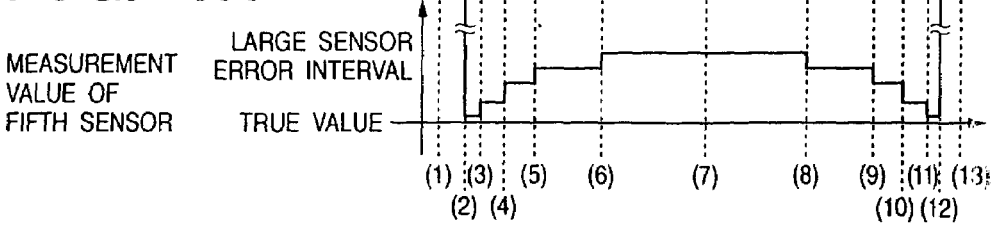
Figure 18A:
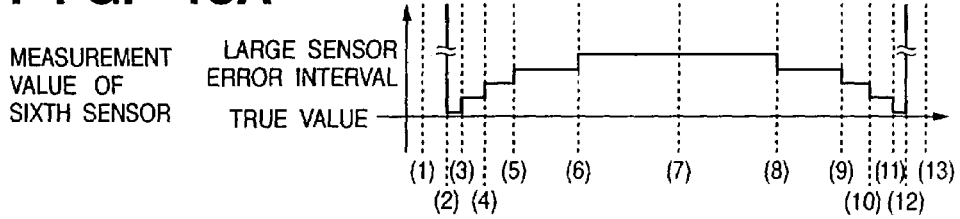
FIGS. 18A to 18E are timing charts (example 1) showing the ground current and measurement error of the measurement apparatus according to the fourth embodiment of the present invention.
Figure 18B:
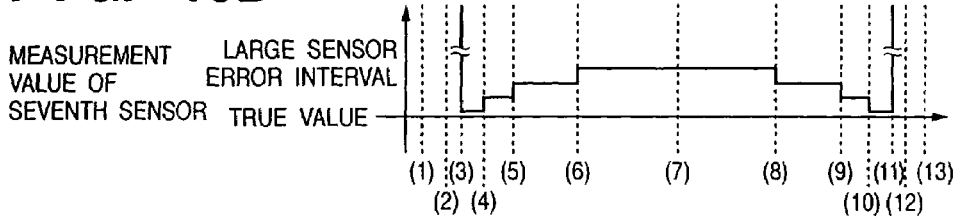
Figure 18C:
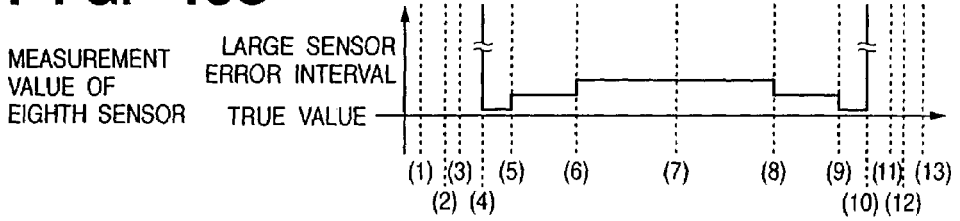
Figure 18D:
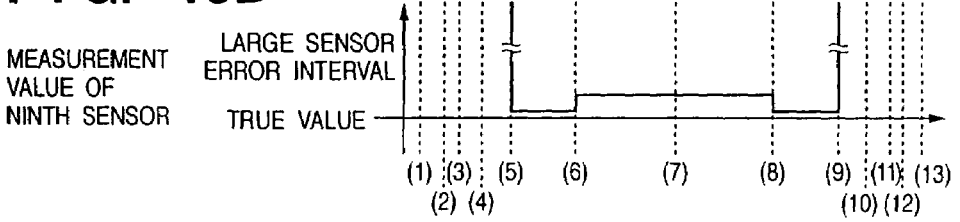
Figure 18E:
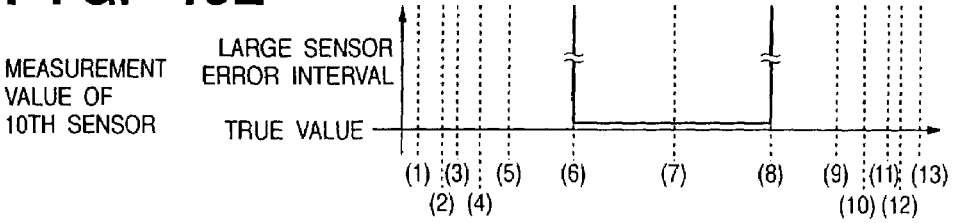
Figure 20A:
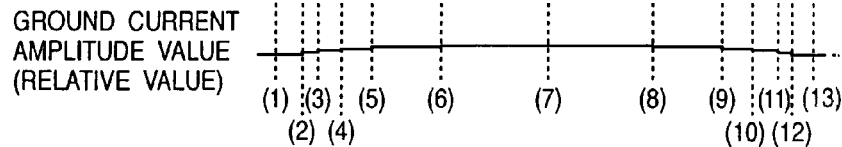
FIGS. 20A to 20F are timing charts (example 2) showing the ground current and measurement error of the measurement apparatus according to the fourth embodiment of the present invention.
Figure 20B:
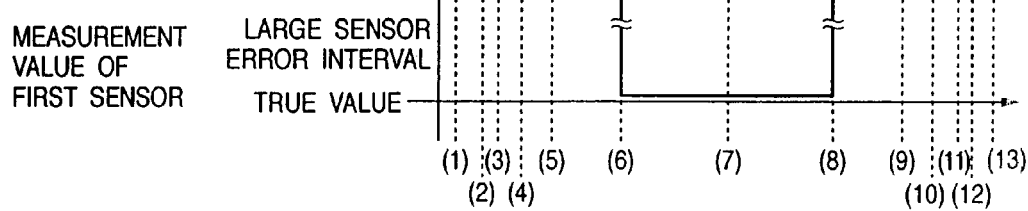
Figure 20C:
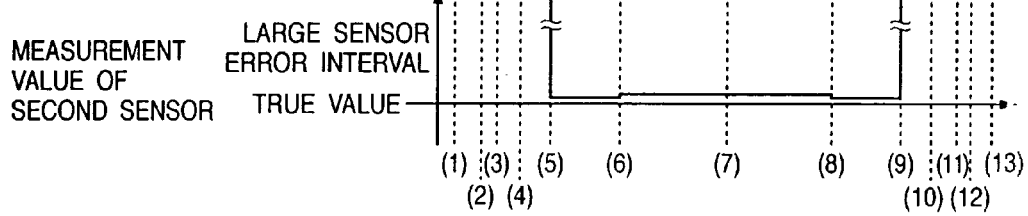
Figure 20D:
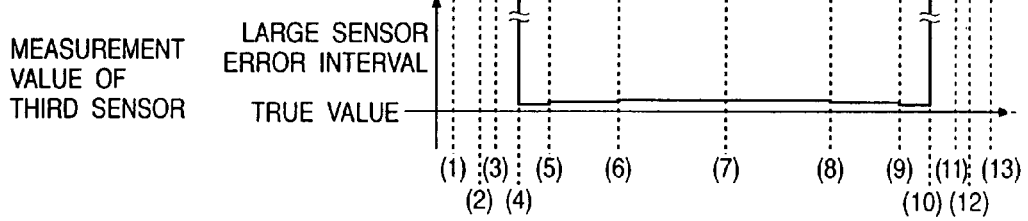
Figure 20E:
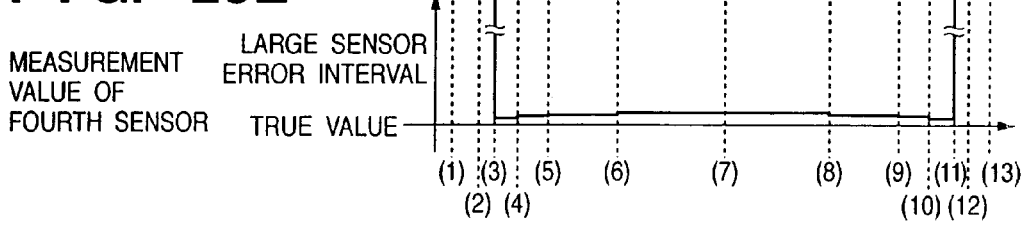
Figure 20F:
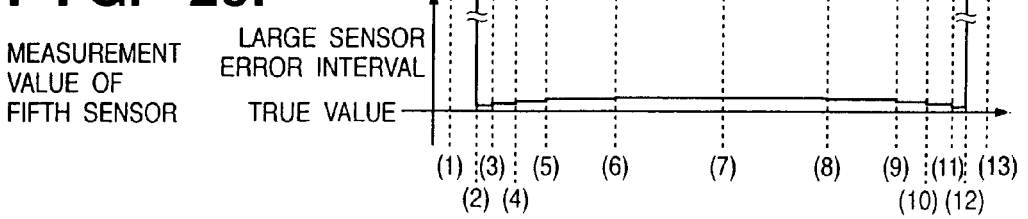
Figure 21A:
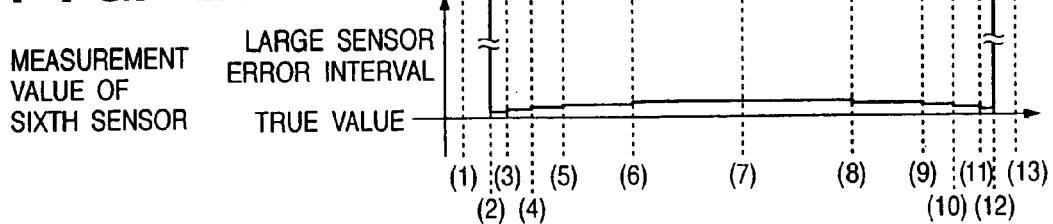
FIGS. 21A to 21E are timing charts (example 2) showing the ground current and measurement error of the measurement apparatus according to the fourth embodiment of the present invention.
Figure 21B:
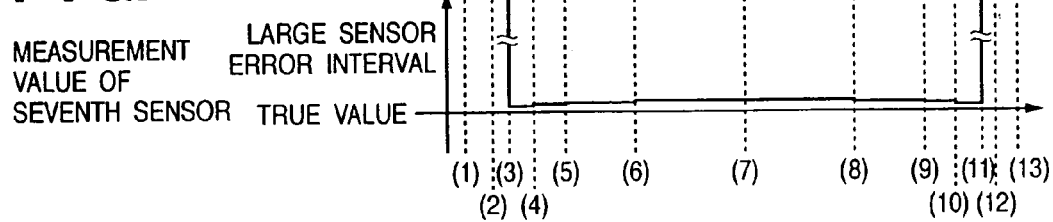
Figure 21C:
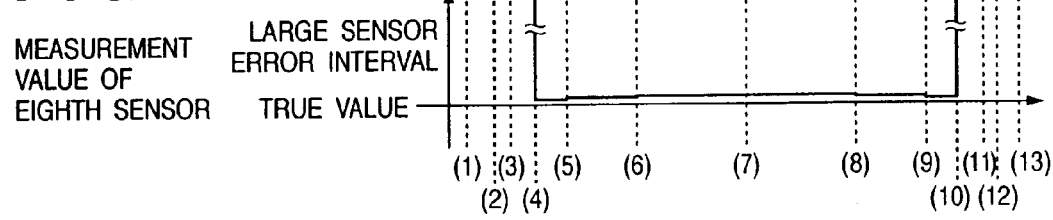
Figure 21D:
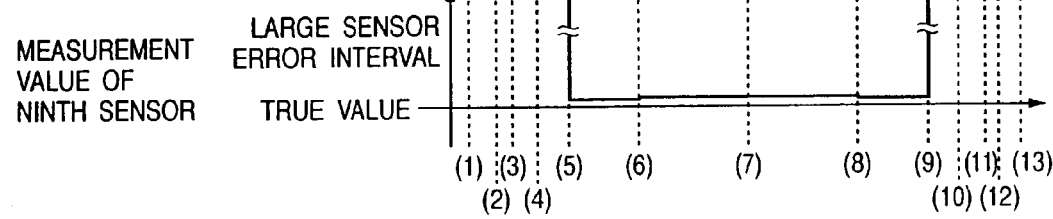
Figure 21E:
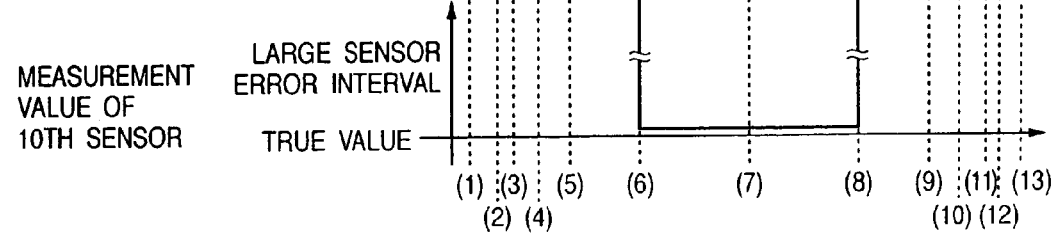

FIG. 13 is a circuit diagram showing the equivalent circuit of an electrostatic sensor measurement system according to the fourth embodiment. Reference numerals 601 to 610 denote (10) sensor amplifiers corresponding to the first to 10th wafer measurement sensors. Reference numeral 611 denotes a sensor amplifier for the mask measurement sensor. Cw1 to Cw10 represent the electrostatic capacitances of measurement gaps corresponding to the first to 10th wafer measurement sensors. Cm represents the electrostatic capacitance of the measurement gap for the mask measurement sensor. Of impedances inside the wafer, Zw1 to Zw10 for the respective wafer sensors are independent terms, and Zw11 is a common term. Zw12 is a term common to the respective wafer sensors outside the wafer. The impedances of the wafer chuck, wafer stage, and anther capacitive coupling portion correspond to Zw12. Zm is an independent term for the mask sensor, and Z13 is a term common to all the sensors. Z13 is a substantially ignorable value. The most influential term is Zw12. Owing to Zw12, the first to 10th wafer sensors readily interfere with each other.

FIGS. 14A to 14F and 15A to 15G show the relationship between the stage position and measurement.

The measurement phase relationship will be explained with reference to FIGS. 16A to 16J, 17A to 17F, 18A to 18E, 19A to 19J, 20A to 20F, and 21A to 21E.

FIGS. 16A to 16J show drive currents when all the sensors are used in the same phase in the arrangement of the fourth embodiment, similar to the related art. As a result of measurement in this case, the interference between the sensors appears by a change in ground current depending on the number of sensors facing the wafer, as shown in FIGS. 17A to 17F and 18A to 18E.

When the sensors are driven in phases shown in FIGS. 19A to 19J in the arrangement of the fourth embodiment, the ground current can always be canceled. Two sensors arranged symmetrical about a line parallel to the X-axis passing through the wafer center are paired. Sensor drive current phases shown in FIGS. 19A to 19J are set opposite between the currents of each pair. This makes the ground current almost constant regardless of the number of sensors facing the wafer. FIGS. 20A to 20F and 21A to 21E show measurement results in this case. The cause of generating a slight error in the measurement value in FIGS. 20A to 20F and 21A to 21E is that the sensor currents of each pair are not completely canceled. This is because sensor current amplitudes do not coincide with each other and the phase difference cannot be completely set to 180°. These causes are mounting problems, and the error can be further reduced.

In the fourth embodiment, the fifth and sixth sensors having the largest measurement length are most readily influenced by the remaining sensors. When the remaining sensors pass over the wafer boundary, measurement values may be suddenly disturbed. To reduce such measurement error which is hardly corrected, the stage DSP 53 in FIG. 12 is effectively equipped with the following phase setting means. That is, attention is given to the measurement value of a sensor (to be referred to as a sensor A) which suffers the most serious measurement error, and a sensor whose interference causes the above-mentioned sudden disturbance is estimated. More specifically, the disturbance is estimated to be generated under the influence of a sensor (to be referred to as a sensor B) which has passed over the wafer boundary at stage coordinates or time at which the measurement value has disturbed. The phase of the sensor B is slightly changed to perform measurement again, and a condition under which the measurement result of the sensor A is improved is determined. If another sensor suffering a measurement error exists under this condition, conditions are similarly searched for one under which all sensor precisions satisfy the requirement.

In the fourth embodiment, the sensor is fixed, and the wafer stage is driven to measure each point on the wafer. From the gist of the present invention, the same effects can also be achieved even if the sensor is mounted on a movable mechanism, measurement is done while changing the relative positions by moving the sensor or both the sensor and wafer, and points on the wafer are measured.

In the fourth embodiment, the number of sensors which simultaneously pass over the wafer boundary is two. When, for example, three sensors simultaneously pass over the wafer boundary, a phase difference of 120° is effective. The phases and/or current amplitude values of AC current signals supplied to a plurality of sensor probes simultaneously positioned at the target boundary are preferably so determined as to, when a plurality of sensor probes pass over the target boundary, minimize changes in the measurement values of the remaining sensors.

The controller in the fourth embodiment can determine the phases or/and current amplitude values of AC current signals supplied to the respective sensor probes in accordance with the layout of the sensor probes, the target shape, the position coordinates of the target stage or/and probe stage.

As described above, according to the fourth embodiment of the present invention, a system which executes measurement by relatively moving a target and electrostatic capacitance sensor can efficiently perform measurement in accordance with the position coordinates and/or moving speed.

The measurement apparatus according to each of the above embodiments can be adopted as a device manufacturing apparatus such as a semiconductor manufacturing apparatus or exposure apparatus by using a semiconductor wafer or transfer master as a target to be measured.

[Other Embodiments]

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A measurement apparatus which measures a distance between a sensor probe and a target to be measured by using an electrostatic capacitance sensor, comprising:
   first and second sensor probes which are arranged at respective predetermined gaps to the target; and
   first and second sensor amplifiers which are connected respectively to the first and second sensor probes,
   wherein when a distance between the target and the first or second sensor probe is measured, said first amplifier supplies a first current with the first sensor probe and said second amplifier supplies a second current which is different phase and/or amplitude from the first current, and
   wherein said sensor probes are so arranged as to simultaneously position centers of said plurality of sensor probes at a target boundary upon a change of a relative position of said sensor probes and the target.

2. The apparatus according to claim 1, wherein when said gap is measured by the first sensor probe, the amplitude of the second current is set to 0.

3. The apparatus according to claim 1, wherein when said gap is measured by the first sensor probe, a change rate of the amplitude of the second current is set to 0.

4. The apparatus according to claim 1, wherein said phases of the first and second current are set to be different by 180.

5. The apparatus according to claim 1, further comprising a mechanism which changes a relative position of each sensor probe and target and a controller which determines the phases and/or amplitudes of the first and second current based on each of the relative position.

6. A measurement apparatus which measures a distance between a sensor probe and a target to be measured by using an electrostatic capacitance sensor, comprising:
   first, second and third sensor probes which are arranged at respective predetermined gaps to the target; and
   sensor amplifiers which supply currents to the sensor probes and output measurement results,
   wherein the sensor amplifiers supply a first current to the first sensor probe, a second current to the second sensor probe and a third current to the third sensor probe, and the phases of the first, second and third currents are set to be different by 120°, and wherein said sensor probes are so arranged as to simultaneously position centers of said plurality of sensor probes at a target boundary upon a change of a relative position of said sensor probes and the target.

7. The apparatus according to claim 6, further comprising a mechanism which changes a relative position of each sensor probe and target and a controller which determines the phases and/or amplitudes of the first and second current based on each of the relative position.

* * * * *

UNITED STATES PATENT AND TRADEMARK OFFICE
CERTIFICATE OF CORRECTION

PATENT NO. : 7,019,538 B2
APPLICATION NO. : 10/763329
DATED : March 28, 2006
INVENTOR(S) : Atsushi Kitaoka It is certified that error appears in the above-identified patent and that said Letters Patent is hereby corrected as shown below:

COLUMN 2:
Line 59, "output" should read -- outputs --; and
Line 60, "firs" should read -- first --.

COLUMN 8:
Line 31, "patter)" should read -- pattern) --.

COLUMN 13:
Line 66, "anther"should read -- another --.

COLUMN 15:
Line 43, "Example" should read -- Examples --.

COLUMN 16:
Line 50, "current" should read -- currents --;
Line 51, "by 180." should read -- by 180°. --;
Line 55, "current" should read -- currents --; and
Line 56, "position." should read -- positions. --.

COLUMN 18:
Line 4, "current" should read -- currents --;
Line 5, "position." should read -- positions. --.

Signed and Sealed this

Thirtieth Day of January, 2007

JON W. DUDAS
*Director of the United States Patent and Trademark Office*